US008112587B2

(12) United States Patent  (10) Patent No.: US 8,112,587 B2
Cantin et al.  (45) Date of Patent: Feb. 7, 2012

(54) SHARED DATA PREFETCHING WITH MEMORY REGION CACHE LINE MONITORING

(75) Inventors: Jason F. Cantin, Austin, TX (US); Steven R. Kunkel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 12/432,823

(22) Filed: Apr. 30, 2009

(65) Prior Publication Data

US 2010/0281221 A1  Nov. 4, 2010

(51) Int. Cl.
*G06F 13/28* (2006.01)

(52) U.S. Cl. . 711/132; 711/137; 711/141; 711/E12.001; 711/E12.026; 711/E12.038; 711/E12.057

(58) Field of Classification Search .................. 711/132, 711/137, 141, E12.001, E12.026, E12.038, 711/E12.057
See application file for complete search history.

(56) References Cited

U.S. PATENT DOCUMENTS

| 6,219,780 | B1 |   | 4/2001  | Lipasti |           |
|-----------|----|---|---------|---------|-----------|
| 6,487,639 | B1 |   | 11/2002 | Lipasti |           |
| 6,487,640 | B1 |   | 11/2002 | Lipasti |           |
| 6,578,130 | B2 | * | 6/2003  | Barrick et al. | 711/213 |
| 7,085,897 | B2 | * | 8/2006  | Blake et al. | 711/144 |
| 7,890,707 | B2 | * | 2/2011  | Magruder et al. | 711/150 |
| 8,024,513 | B2 | * | 9/2011  | Barth et al. | 711/106 |
| 2008/0215821 | A1 |   | 9/2008 | Cantin et al. |      |

OTHER PUBLICATIONS

U.S. Appl. No. 12/177,176, entitled "Enhanced Coherency Tracking with Implementation of Region Victim Hash for Region Coherence Arrays, " filed Jul. 22, 2008 by Robert H. Bell, Jr. et al.
Cantin, Jason F., Lipasti, Mikko H., and Smith, James E., Improving Multiprocessor Performance with Coarse-Grain Coherence Tracking, Computer Architecture, 2005. ISCA '05. Proceedings. 32nd International Symposium, Jun. 4-8, 2005, pp. 246-257, USA. (12 pages).
Cantin, Jason F., Lipasti, Mikko H., and Smith, James E., Stealth Prefetching, Association for Computing Machinery, 2006. (9 pages).
Enright Jerger, Natalie D., Hill, Eric L., and Lipasti, Mikko H., Friendly Fire: Understanding the Effects of Multiprocessor Prefetching, Performance Analysis of Systems and Software, 2006 IEEE International Symposium, Mar. 19-21, 2006, pp. 177-188, USA. (12 pages).

* cited by examiner

*Primary Examiner* — Pho M Luu
(74) *Attorney, Agent, or Firm* — Wood, Herron & Evans

(57) ABSTRACT

A method, circuit arrangement, and design structure for prefetching data for responding to a memory request, in a shared memory computing system of the type that includes a plurality of nodes, is provided. Prefetching data comprises, receiving, in response to a first memory request by a first node, presence data for a memory region associated with the first memory request from a second node that sources data requested by the first memory request, and selectively prefetching at least one cache line from the memory region based on the received presence data. Responding to a memory request comprises tracking presence data associated with memory regions associated with cached cache lines in the first node, and, in response to a memory request by a second node, forwarding the tracked presence data for a memory region associated with the memory request to the second node.

25 Claims, 9 Drawing Sheets

SHARED DATA PREFETCHING WITH MEMORY REGION CACHE LINE MONITORING

FIELD OF THE INVENTION

The invention is generally related to computing systems, and more particularly to tracking information about multi-cache line memory regions in a shared memory computing system.

BACKGROUND OF THE INVENTION

Computer technology continues to advance at a remarkable pace, with numerous improvements being made to the performance of both processing units—the "brains" of a computing system—and the memory that stores the data processed by a computing system.

In general, a processing unit is a microprocessor or other integrated circuit that operates by executing a sequence of instructions that form a computer program. The instructions are typically stored in a memory system having a plurality of storage locations identified by unique memory addresses. The memory addresses collectively define a "memory address space," representing an addressable range of memory regions that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory often becomes a significant bottleneck on performance of the microprocessor as well as the computing system. To decrease this bottleneck, it is often desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on performance. Often, a computing system relies on a relatively large, slow and inexpensive mass storage system such as a hard disk drive or other external storage device, an intermediate main memory that uses dynamic random access memory (DRAM) devices or other volatile memory storage devices, and one or more high speed, limited capacity cache memories, or caches, implemented with static random access memory (SRAM) devices or the like. Information from segments of the memory regions, often known as "cache lines" of the memory regions, are often transferred between the various memory levels in an attempt to maximize the frequency that requested cache lines are stored in the fastest cache memory accessible by the microprocessor. Whenever a memory request from a requester attempts to access a cache line, or entire memory region, that is not cached in a cache memory, a "cache miss," or "miss," typically occurs. As a result of a cache miss, the cache line for a memory address typically must be retrieved from a relatively slow, lower level memory, often with a significant performance penalty. Whenever a memory request from a requester attempts to access a cache line, or entire memory region, that is cached in a cache memory, a "cache hit," or "hit," typically occurs and the cache line or memory region is supplied to the requester.

Cache misses in particular have been found to significantly limit system performance. In some designs, for example, it has been found that over 25% of a microprocessor's time is spent waiting for retrieval of cache lines after a cache miss. Therefore, any mechanism that can reduce the frequency and/or latency of cache misses can have a significant impact on overall performance.

One conventional approach for reducing the impact of cache misses is to increase the size of the cache to in effect reduce the frequency of misses. However, increasing the size of a cache can add significant cost. Furthermore, oftentimes the size of the cache is limited by the amount of space available on an integrated circuit device. Particularly when the cache is integrated onto the same integrated circuit device as a microprocessor to improve performance, the amount of space available for the cache is significantly restricted.

Another conventional approach includes decreasing the miss rate by increasing the associativity of a cache, and/or using cache indexing to reduce conflicts. While each approach can reduce the frequency of data cache misses, however, each approach still incurs an often substantial performance hit whenever cache misses occur.

Yet another conventional approach for reducing the impact of cache misses incorporates various prediction techniques to attempt to predict what data will be returned in response to a cache miss prior to actual receipt of such data.

However, conventional approaches for reducing the impact of cache misses often introduce additional problems to shared memory computing systems. Generally, shared memory computing systems include a plurality of microprocessors that share a common memory. Microprocessors are permitted to obtain exclusive or shared ownership of a cache line, with the former usually required whenever a microprocessor needs to modify data stored in the cache line, and the latter being permitted whenever multiple microprocessors merely need to read the data in the cache line. A coherence protocol, typically using either a central directory or a snooping protocol, is used to coordinate the retrieval of a cache line by a microprocessor, such that a requesting microprocessor always receives a current copy of the data in a cache line. A coherence protocol often requires a microprocessor to broadcast a request over a shared memory bus, which results in a lookup being performed either in a central directory or in each individual node in the shared memory system to determine the status of the requested cache line, with the requested cache line ultimately returned to the requesting processor and the status of that cache line being updated to reflect the new ownership status of the cache line. Given that a memory bus is a limited resource, the broadcast of memory requests over the memory bus can result in decreased performance, so it is desirable whenever possible to minimize the number of memory requests that are broadcast over a shared memory bus.

One difficulty encountered in shared memory computing systems occurs when multiple microprocessors are attempting to access the same cache line at the same time. In some systems, microprocessors are forced to compete for the same cache line, often resulting in inefficiencies as the cache line is shuttled back and forth between caches, memory levels, and microprocessors of the shared memory computing system, and often without having time to be processed or updated. Moreover, conventional approaches for sharing and prefetching data typically introduce additional intra-node communications. For example, it often occurs that microprocessors processing one cache line often request another cache line from the same memory region. As such, a microprocessor is typically forced to broadcast a first memory request for a first cache line of the memory region, a second memory request for a second cache line of the memory region, and so-on. Thus, the microprocessors of the shared memory computing system are generally forced to respond to the communications unnecessarily as memory requests must be processed to determine if the requested data is present in those nodes, and if so, a response must be generated. Therefore, any mechanism configured to share memory regions and reduce the frequency and/or severity of competition between the microprocessors can have a significant impact on overall performance. Moreover, any mechanism configured to reduce the frequency of communications between the microprocessors can also have a significant impact on overall performance.

Still another conventional approach for reducing the impact of microprocessor communications involves optimizing routing for data requests and uses coarse-grain coherence tracking to monitor the coherence of memory regions and the use of that information to avoid unnecessary broadcasts. With coarse-grain coherence tracking, the status of cache lines is tracked with a coarser granularity, e.g., on a region-by-region basis, where each region contains multiple cache lines. By doing so, information about the access characteristics of multiple cache lines within the same region can be used to make more intelligent prefetching decisions and otherwise reduce memory request latency. In particular, it has been found that coarse-grain coherence tracking eliminates about 55% to about 97% of unnecessary broadcasts for cache lines, and thus improves performance by about 8%. Specifically, coarse-grain coherence tracking uses a region coherence array to track memory regions cached and prevent unnecessary subsequent broadcasts for cache lines from a memory region.

One more conventional approach for reducing the impact of microprocessor communications incorporates stealth prefetching into coarse-grain coherence tracking to identify non-shared memory regions and aggressively prefetch cache lines from those memory regions. In particular, stealth prefetching often does not broadcast a memory request to prefetch cache lines from non-shared memory regions, thus preventing unnecessary broadcasts for cache lines from a non-shared memory region. However, conventional approaches for reducing the impact of cache misses, reducing the impact of microprocessor competition, and reducing the impact of microprocessor communications often introduce problems in shared memory computing systems. Stealth prefetching, on the other hand, is limited to prefetching non-shared data and typically does not prefetch a memory region when cache lines of that memory region are shared by more than one microprocessor.

Consequently, there is a need in the art for reducing the impact of cache misses, reducing the impact of microprocessor competition, and improving microprocessor communications in a shared memory computing system.

SUMMARY OF THE INVENTION

Embodiments of the invention provide a method, circuit arrangement, and design structure to prefetch data and respond to memory requests in a shared memory computing system by tracking presence data associated with cache lines in such memory regions as are cached in the shared memory regions and transferring the presence data between the nodes of the shared memory computing system when requested. In those embodiments, each node, including a first node, may track presence data associated with cache lines in that first node. In response to a memory request from a second node associated with data from a memory region, such as a cache line, presence data for the memory region along with the data may be forwarded to the second node when the first node includes that data and presence data. Thus, in some embodiments, the second node may receive presence data in response to a memory request for the data along with the data from the first node and selectively prefetch at least one cache line from the memory region based on the received presence data. In particular, the second node may request one or more cache lines of the memory region that are not shared as indicated by the presence data. This request may be broadcast to the nodes of the shared memory computing system or issued directly to a memory of the shared memory computing system. In this manner, embodiments of the invention may avoid unnecessary memory request broadcasts, as the presence data may indicate the nodes sharing the memory region as well as the state of the memory region in those nodes.

In one embodiment consistent with the invention, a memory request in a shared memory computing system of the type that includes a plurality of nodes is responded to by, in a first node among a plurality of nodes, and for each of a plurality of multi-cache line memory regions for which data is cached on the first node, tracking presence data associated with cache lines in such memory regions that are cached in the first node. In addition, in response to a memory request to the shared memory computing system generated by a second node among the plurality of nodes for which the first node will source data requested by the memory request, the tracked presence data for a memory region with which the memory request is associated is forwarded to the second node.

In an alternative embodiment consistent with the invention, data in a shared memory computing system of the type that includes a plurality of nodes, where each node includes at least one memory requester, is prefetched by, in a first node among the plurality of nodes, receiving, from a second among the plurality of nodes that sources data requested by a first memory request, presence data for a multi-cache line memory region with which the first memory request is associated in response to the first memory request to the shared memory computing system generated by the first node. In that embodiment, the presence data is associated with cache lines in the memory region that are cached in the second node, and at least one cache line is selectively prefetched from the memory region based upon the presence data received from the second node.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Figure 1:
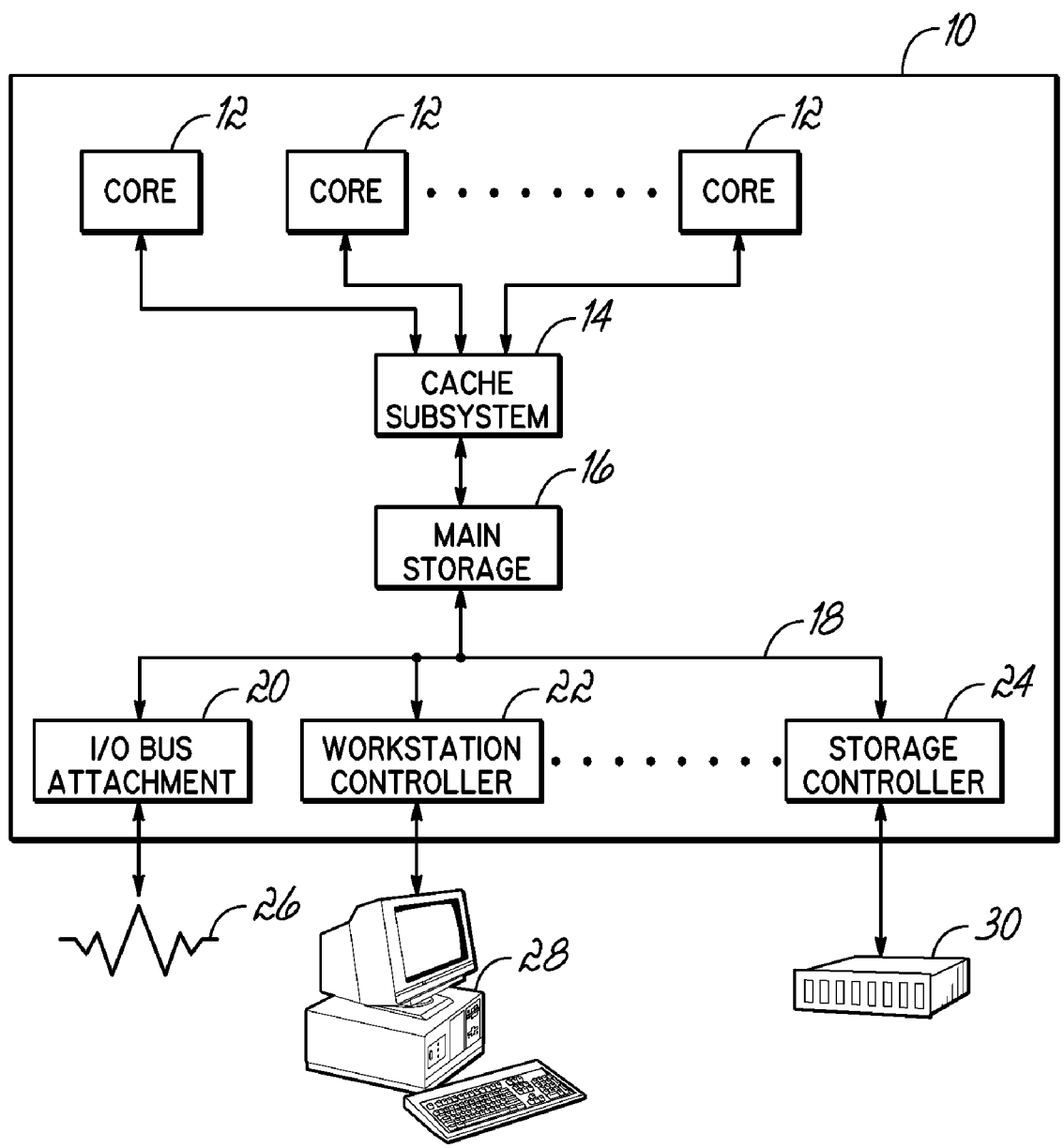
FIG. 1 is a block diagram of a shared memory computing system incorporating shared data prefetching consistent with embodiments of the invention.

Embodiments of the invention provide a method, circuit arrangement, and design structure to respond to a memory request in a shared memory computing system of the type that includes a plurality of nodes. Embodiments of the invention also provide a method of prefetching data in a shared memory computing system of the type that includes a plurality of nodes. Thus, embodiments of the invention provide for shared data prefetching with memory region cache line monitoring consistent with embodiments of the invention.

Shared data prefetching with memory region cache line monitoring consistent with some embodiments of the invention utilizes coarse-grain coherence tracking of memory regions with hardware-based arrays and/or buffers to store cache lines as well as presence data thereof. In some embodiments, a region coherence array tracks memory regions from which a node is caching lines, as well as which cache lines from each memory region the node is caching. In alternative embodiments, the region coherence array tracks memory regions from which the node is caching cache lines as well as the number of cache lines from each memory region the node is caching. Throughout those embodiments, the node may include a prefetch data buffer to store prefetched cache lines of memory regions before those cache lines are requested and subsequently placed in a cache and/or processing element, as well as a prefetch region buffer that stores memory regions that may be candidates for prefetching but that otherwise are not associated with cached cache lines. However, in alternative embodiments, the node may include a cache region buffer to track regions for which the node is caching cache lines and a prefetch data buffer that stores prefetched cache lines that otherwise are not associated with memory regions of cached cache lines. Throughout these embodiments, the region coherence array or the cached region buffer may also keep track of the state of the cached cache lines and/or their respective memory regions.

In some embodiments, the region coherence array and/or the cache of a first node is accessed in response to a memory request from a second node. This memory request may be associated with a cache line from a memory region. When there is an access for the cache line or presence data associated with the memory region of the cache line that succeeds, otherwise referred to as a "hit" for the cache line or presence data, the presence data for the memory region of the cache line may be transferred to the second node. When there is a hit for the cache line, in some embodiments the cache line is transferred to the second node and invalidated in the first node, while in alternative embodiments a copy of the cache line may be transferred, and in further alternative embodiments the cache line is not transferred at all. In response to transferring the cache line, the region coherence array for the first node may downgrade the state of the memory region.

In the second node, the presence data associated with the memory request may be stored in a region coherence array of the second node in response to receiving that presence data, while the cache line associated with the memory request may be stored in a cache in response to receiving that cache line. The second node may prefetch at least one cache line from the memory region based upon the presence data received from the first node. For example, the second node may request one or more cache lines of the memory region that are not shared as indicated by the presence data. This request may be broadcast to the nodes of the shared memory computing system or issued directly to a memory of the shared memory computing system. Additionally, the second node may request one or more cache lines of the memory region that are shared as indicated by the presence data by broadcasting a memory request to the nodes of the shared memory computing system. In this manner, unnecessary memory requests may not be broadcasted to the nodes, as presence data for a memory region may indicate the nodes sharing the memory region as well as the state of the memory region in those nodes.

In some embodiments, a processing element of a node accesses the cache of that node for a cache line from a memory region. When there is an access for that cache line in the cache that fails, otherwise referred to as a "cache miss" or "miss" for that cache line, the processing element may access the prefetch data buffer for that cache line and, in the event of a hit for the cache line in the prefetch data buffer, move the cache line to the cache. When there is a miss for that cache line in the prefetch data buffer, a memory request for either the cache line or the cache line and the rest of the memory region may be generated and sent to the nodes of the shared memory computing system. The memory request may be for the memory region when a threshold of separate cache lines for the memory region have been requested by the processing element. Moreover, the cache lines of the memory region may be selectively requested. For example, the cache lines of the memory region may be selectively requested based on the presence data such that only those cache lines from the memory region that are not currently cached by the node may be requested. Alternatively, the cache lines of the memory region may be selectively requested such that only some of those cache lines from the memory region that are not currently cached by the node may be requested. Furthermore, the request for the memory region may be a blanket request for any cache lines of the memory region.

In some embodiments, the presence data includes a memory region bit-mask indicating each cache line from the memory region cached in the first node. In some embodiments, the presence data includes a cache line count indicating a number of cache lines from the memory region cached in the first node. Furthermore, in some embodiments the data requested by the memory request includes data selected from the group consisting of at least one cache line of the memory region, the tracked presence data for the memory region, and combinations thereof.

In some embodiments, for each of a plurality of multi-cache line memory regions for which data is cached on the second node, presence data associated with cache lines in such memory regions that are cached in the second node is tracked. In some embodiments, a region coherence array in the second node for the presence data associated with cache lines in the memory region is accessed and, in response to a miss for such presence data in the region coherence array, the memory request associated with the memory region is generated and sent to the plurality of nodes of the system, including the first node.

Throughout the embodiments, a first node may also transfer presence data for a memory region adjacent to the memory region associated with a memory request to a second node in response to that memory request. Thus, the second node may not only receive presence data for memory regions that is the subject of the memory request, but also presence data for at least one memory region adjacent to that memory region. Therefore, the second node may selectively prefetch a second cache line from a second region, such as an adjacent memory region, based upon the presence data received in response to, and associated, with the memory request.

Hardware and Software Environment

Turning more particularly to the drawings, wherein like numbers denote like parts throughout the several views, FIG. 1 is a block diagram of a shared memory computing system 10 consistent with embodiments of the invention. Shared memory computing system 10, in specific embodiments, may be a computer, computer system, computing device, server, disk array, or programmable device such as a multi-user computer, a single-user computer, a handheld device, a networked device (including a computer in a cluster configuration), a mobile phone, a video game console (or other gaming system), etc. Shared memory computing system 10 may be referred to as "computing system," but will be referred to as "computer" for the sake of brevity. One suitable implementation of computer 10 may be a multi-user computer, such as a computer available from International Business Machines Corporation.

Computer 10 generally includes one or more microprocessors 12 (illustrated as, and hereinafter, "cores" 12) coupled to a memory subsystem that may further include a cache subsystem 14 and main storage 16. The cache subsystem 14 may be comprised of dynamic random access memory ("DRAM"), static random access memory ("SRAM"), flash memory, and/or another digital storage medium that typically comprises one or more levels of data, instruction and/or combination caches, with certain caches serving the cores 12 in a shared manner as is well known in the art. The main storage 16 may comprise a hard disk drive and/or another digital storage medium. Moreover, as will be discussed below, each core 12 may include at least one processing element and at least one level of dedicated cache memory.

Main storage 16 may be coupled to a number of external devices (e.g., I/O devices) via a system bus 18 and a plurality of interface devices, e.g., an input/output bus attachment interface 20, a workstation controller 22, and/or a storage controller 24, which respectively provide external access to one or more external networks 26, one or more workstations 28, and/or one or more storage devices such as a direct access storage device ("DASD") 30. System bus 18 may also be coupled to a user input (not shown) operable by a user of computer 10 to enter data (e.g., the user input may include a mouse, a keyboard, etc.) and a display (not shown) operable to display data from the computer 10 (e.g., the display may be a CRT monitor, an LCD display panel, etc.). Computer 10 may also be configured as a member of a distributed computing environment and communicate with other members of that distributed computing environment through network 26.

The computer 10 includes at least one memory requester to request a cache line that is serviced by a common cache memory (e.g., the cache subsystem 14 and/or cache memory of at least one core 12) as is well known in the art. For example, the computer 10 of FIG. 1 may include one or more cores 12 serviced by a common cache memory, while each core 12 may include one or more memory requesters for cache lines serviced by a common cache memory (e.g., the cache subsystem 14, main storage 16, and/or memory internal to the cores 12). In specific embodiments, the requesters in computer 10 may include at least one core 12, a component of a core 12 (e.g., a cache, region coherence array, prefetch region buffer, prefetch data buffer, and/or cached region buffer as disclosed below), and/or a processing element of a core 12 (as well as a hardware thread of a processing element).

Figure 2:
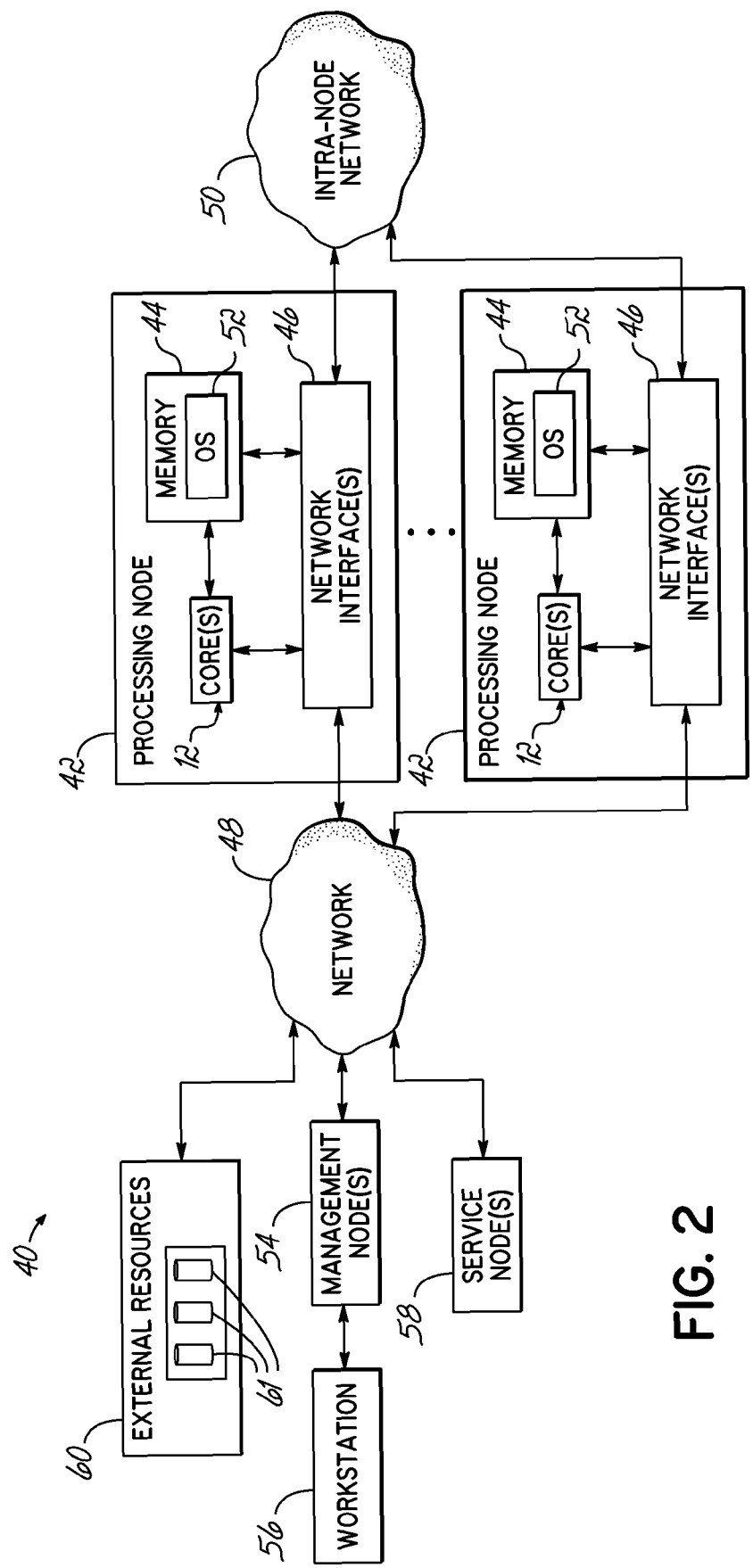
FIG. 2 is a block diagram of a shared memory computing system incorporating shared data prefetching consistent with alternative embodiments of the invention.

Computer 10 is merely representative of one suitable environment for use with embodiments of the invention, and that embodiments of the invention may be utilized in various other alternative environments. For example, FIG. 2 is a block diagram of an alternative shared memory computing system 40 consistent with embodiments of the invention. The alternative shared memory computing system 40, hereinafter "system" 40, may include a plurality of processing nodes 42 that each include at least one core 12, a memory 44, and a network interface 46. The network interface 46, in turn, may communicate with at least one network 48, 50, and in particular the network interface 46 may be configured to communicate with at least one intra-node network 50 dedicated to communication between the processing nodes 42. Each processing node 42 may be configured with an operating system 52 and application (not shown). In typical embodiments, each of the processing nodes 42 is configured to receive and process at least one task with the application, and thus the processing nodes 42, collectively, are configured to perform the bulk of the work of the system 40. In some embodiments, however, some processing nodes 42 may be configured as dedicated I/O nodes and thus maintain an interface between a subset, or "group," of processing nodes 42 and the network(s) 48, 50. Moreover, I/O nodes may be operable to perform process authentication and authorization, task accounting, debugging, troubleshooting, booting, and configuration operations as is well known in the art. Thus, the total work for a group of processing nodes 42 may be simplified and additional burdens on each of the group of processing nodes 42 that would be presented by interfacing with the entirety of the processing nodes 42 and the rest of the system 40 are avoided. Processing node 42 may include more than one processing unit 12, and, in specific embodiments, each node may include two or four processing units 12 as is well known in the art.

The system 40 may include one or more management nodes 54 that may store compilers, linkers, loaders, and other programs to interact with the system 40. The management nodes 54 may be accessed by a user at a workstation 56, which may be controlled by at least one management node 54. Thus, the user may submit one or more programs for compiling, tasks for execution, execution contexts, workloads, part of a workload, or jobs to one or more service nodes 58 of the system 40. The management nodes 54 may each include at least one core and a memory in a similar manner to that of the processing nodes 42 to perform auxiliary functions which, for reasons of efficiency or otherwise, may be best performed outside the processing nodes 42 or service nodes 58. For example, interactive data input, software code editing, software code compiling, and/or other user interface functions may be handled by the management nodes 54.

The service nodes 58 may include databases and administrative tools for the system 40. The databases may maintain state information for the processing nodes 42, including the current scheduling of tasks across the processing nodes 42, while the administrative tools may control the scheduling and loading of programs, tasks, data, and jobs onto the processing nodes 42, including loading programs, tasks, data, and jobs onto computing core of each core 12 of each processing node 42. As such, the service nodes 58 may, in some embodiments, gather a group of processing nodes 42 from the plurality of processing nodes 42 and dispatch at least one task, job, application, part of a workload, execution context, or program to the group of compute nodes 12 for execution. Hereinafter, the at least one task, job, application, part of a workload, execution context, or program will be referred to as a "task" for the sake of brevity. A task may be communicated across the network 48 and/or 50 and through the I/O nodes to a processing node 42 to be processed. The functionality of the management nodes 54 and/or service nodes 58 may be combined in a control subsystem operable to receive, manage, schedule, redistribute, and otherwise control jobs for the processing nodes 42.

Management nodes 54 and/or service nodes 58 may each include a group of processing nodes 42 and at least one I/O node. In this way, management nodes 54 and/or service nodes 58 may be internally connected to the processing nodes 42 through the intra-node network 50 as well as network 48. Alternately, management nodes 54 and/or service nodes 58 may each include of a group of processing nodes 42 and at least one I/O node separate from the system 40 (i.e., the management nodes 54 and/or service nodes 58 may be configured as "stand-alone" nodes). Furthermore, management nodes 54 and/or services nodes 58 may include only one processing node 42 each. One or more external resource servers 60 may be servers accessible over the network 48 and configured to provide interfaces to various data storage devices, such as, for example, hard disk drives 61, optical drives (e.g., CD ROM drives, CD R/RW drives, DVD+/−R/RW drives, Blu-Ray drives, etc.), solid state memory drives, or other I/O devices, resources, or components that may be accessed for data and/or to process a task.

In a similar manner as the computer 10, the memory 44 of each processing node 42 may include a cache subsystem comprised of DRAM, SRAM, flash memory, and/or another digital storage medium. Additionally, the memory 44 of each processing node 42 may further comprise a main storage that comprises a hard disk drive and/or another digital storage medium. Also similarly, the cache subsystem may comprise one or more levels of data, instruction and/or combination caches, with certain caches serving the cores 12 in a shared manner as is well known in the art.

A node, whether configured as a processing node 42, I/O node, management node 54, or service node 58, is a portion of the system 40 that includes one or more requesters for cache lines and is serviced by a common cache memory (e.g., the memory 44 or a cache memory internal to at least one core 12 of the node 42) as is well known in the art. In specific embodiments, the requesters in the system 40 may include a processing node 42 (hereinafter, "node" 42), a memory 44 of a node, at least one core 12, a component of a core 12 (e.g., a cache, region coherence array, prefetch region buffer, prefetch data buffer, and/or cached region buffer as disclosed below), and/or a processing element of a core 12 (as well as a hardware thread of a processing element). In specific embodiments each node 42 may be configured to process a workload and/or one or more tasks, as well as cooperate with the other nodes 42 to process a workload and/or one or more tasks by communicating with those nodes through respective network interfaces 46 to process the workload and/or the one or more tasks in a parallel fashion as is well known in the art. Although one network interface 46 is shown in FIG. 2, each node 42 may includes a plurality of network interfaces 46 or other network connections. As such, each node 42 may be configured to communicate to the system 40 or other nodes 42 through various networks, including the intra-node network 50. For example, each node 42 may communicate to every other node 42 through a torus network. Moreover, various nodes 42 may be custom configured to perform various functions. As such, some nodes 42 of the system 40 may be configured as computing nodes (e.g., to receive a workload and/or at least one task and process that workload and/or at least one task), I/O nodes (e.g., to manage the communications to and/or from each computing node and the rest of the system 40), management nodes (e.g., to manage the system 40 and receive a workload and/or at least one task), and/or service nodes (e.g., to monitor the system 40, schedule a workload, and/or support the nodes 42). As such, and in some embodiments, the system 40 may have an architecture consistent with a BlueGene® parallel computing system architecture as developed by International Business Machines ("IBM") of Armonk, N.Y. In alternative embodiments, the system 40 may have an architecture consistent with a RoadRunner parallel computing system architecture as also developed by IBM. Moreover, and in further alternative embodiments, the system 40 may have an architecture consistent with a non-uniform memory access ("NUMA") and/or a cache coherent NUMA ("ccNUMA") computing system as is well known in the art. It will also be appreciated that nodes may be defined at a number of different levels in a multi-level shared memory architecture, and in some embodiments need not be distinguished from one another based upon any particular physical allocation or demarcation. Indeed, in some embodiments multiple nodes may be physically disposed in the same computer, on the same card, or even on the same integrated circuit.

As illustrated through FIG. 1 and FIG. 2, the respective computer 10 and processing node 42 (hereinafter, "node" 42) may include one or more cores 12 as is well known in the art. During operation, various instructions and/or data organized into "cache lines" may be required to process a task. As such, and as is well known in the art, it is desirable to prefetch cache lines to process the task faster by having those cache lines that may be used by the core 12 to process the task in the core 12 before those cache lines are requested by that core 12. However, prefetching in a shared memory computing system, such as that illustrated in either FIG. 1 or FIG. 2, presents additional challenges as tasks and cache lines may be processed across many cores 12. Shared data prefetching with memory region cache line monitoring consistent with embodiments of the invention may be implemented in a circuit arrangement on a core 12 or other integrated circuit device to track cache lines used by other cores 12 at the granularity of regions to aid in prefetching shared memory regions. However, it should be appreciated that a wide variety of programmable devices may utilize shared data prefetching consistent with embodiments of the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and shared memory computing systems utilizing such devices and/or circuit arrangements, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others, as well as transmission type media such as digital and analog communications links.

Figure 3:
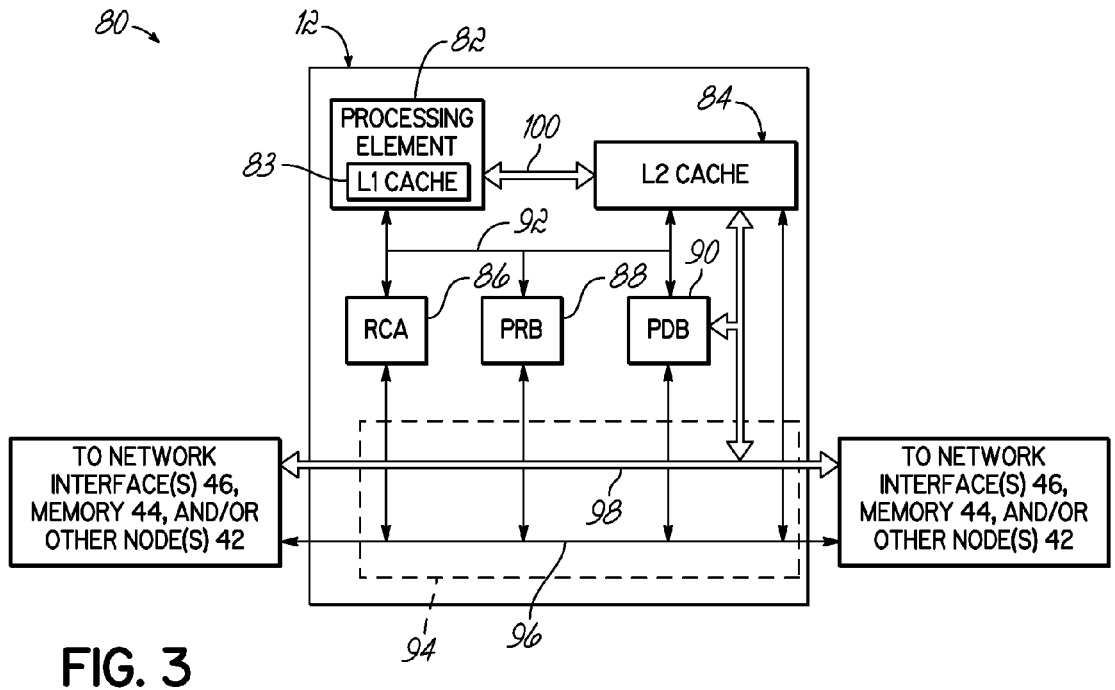
FIG. 3 is a schematic illustration of several components of one embodiment of a circuit arrangement of a processing core of a processing node of the shared memory computing system of FIG. 2.
Figure 4:
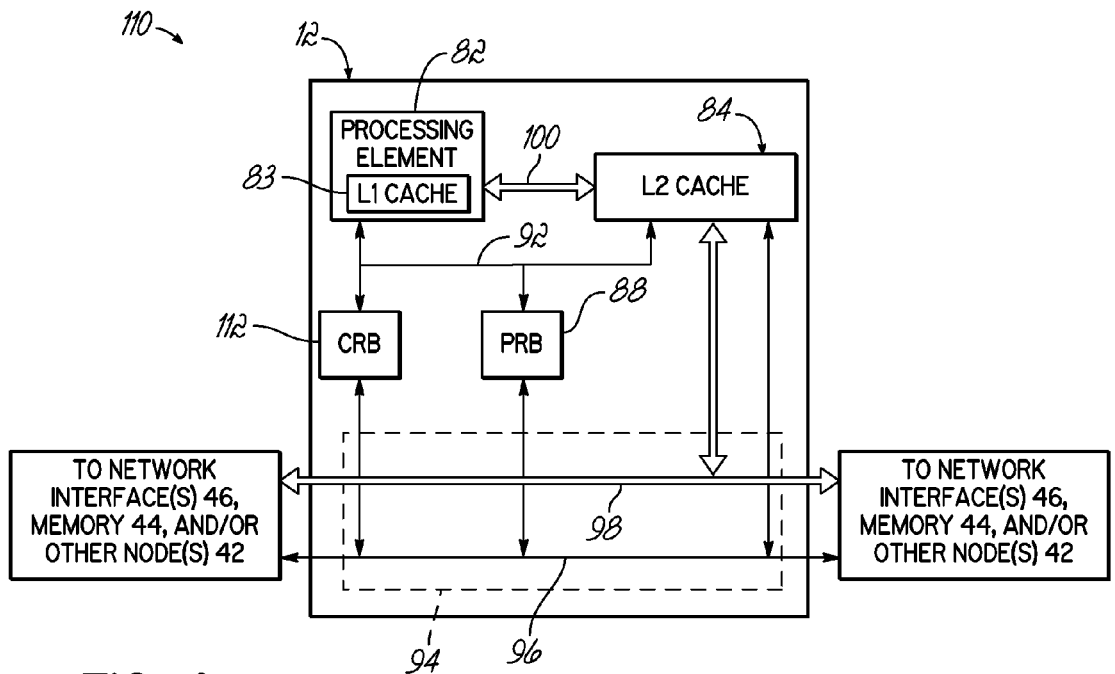
FIG. 4 is a schematic illustration of several components of an alternative embodiment of a circuit arrangement of a processing core of a processing node of the shared memory computing system of FIG. 2.

FIG. 3 and FIG. 4 are schematic illustrations of several components of embodiments of circuit arrangements of a processing core 12 of a processing node 42 of FIG. 2 consistent with embodiments of the invention, while FIGS. 5-11 are illustrations of flowcharts for logic flows in a node 42 consistent with embodiments of the invention. Therefore, although the following FIGS. 3-11 are all made with reference to the shared memory computing system 40 of FIG. 2, the circuit arrangements 80 and 100 illustrated in FIG. 3 and FIG. 4 and the flowcharts of FIGS. 5-11 are equally applicable to the computer 10 of FIG. 1 without departing from the scope of the invention. As such, references to a "node" or "nodes" in the following disclosure is not intended to be limiting, and may be equally applicable to a "core" or "cores," as well as "microprocessor" or microprocessors," respectively, without departing from the scope of the invention.

FIG. 3 is a schematic illustration showing several components of one embodiment of a circuit arrangement 80 in a core 12 of a computing node 42 consistent with embodiments of the invention. The core 12 may include at least one processing element 82 that in turn includes a level-one ("L1") cache 83 and is in communication with at least one additional cache, which may be a level-two ("L2") cache 84 as is well known in the art. In some embodiments, the processing element 82 is configured to process several different threads of execution at once, and thus may be a multi-threaded processing unit as is known in the art. In some embodiments, the L1 cache 83 and/or L2 cache 84 (the "caches 83, 84") are configured to receive a plurality of cache lines (e.g., instructions and/or data) from at least one memory region (e.g., at least a portion of the memory in a memory 44 on that or other nodes 42, and/or across the network 48 in the management nodes 54, workstation 56, service nodes 58, and/or external resource server 60) for the processing element 82 to execute a task. A memory region may be an aligned region of memory of the system 40 that ranges in size from about two cache lines to a physical page size specified by the system 40. Specifically, each memory region may be a power-of-two multiple of the number of cache lines in that memory region multiplied by the size of each cache line. For example, if a memory region has four lines (e.g., $2^2$ cache lines) with about 128 bytes per cache line, the memory region may be about 512 bytes long. Thus, the caches 83, 84 may be configured to store a plurality of cache lines from at least one memory region to process a task.

As illustrated in FIG. 3, the core 12 may include a hardware-based region coherence array 86 (illustrated as, and hereinafter, "RCA" 86) to track presence data of cached cache lines (e.g., cache lines stored in the caches 83, 84) and their associated memory regions. In some embodiments, the presence data may include a cache line count for each memory region that indicates the number of separate cached cache lines of such memory regions. In alternate embodiments, the presence data may include memory region bit-masks for each memory region associated with at least one cached cache line that indicates each cached cache line from those memory regions in the caches 83, 84. Each entry of an RCA 86 may also include a memory region address tag, a set of state bits, a valid bit, parity bits, and/or bits to implement a least-recently-used ("LRU") policy. Thus, the RCA 86 monitors the cached cache lines at the granularity of memory regions.

In some embodiments, the RCA 86 determines the state of memory regions with at least one cached cache line in the node 42. In those embodiments, the state bits may indicate the state of a memory region. For example, the state of a memory region of a first node may be that it is invalid (e.g., that there is no such memory region) or that it is shared. When shared, the memory region may be either clean (e.g., the first node 42 has not modified a cache line of the memory region) or dirty (e.g., the first node 42 has modified a cache line of the memory region). In that example, when the first node 42 receives a memory request from a second node 42 for at least one cached cache line from a memory region in the first node 42, a copy of the presence data for that memory region may be sent to the second node 42, the at least one cached cache line may be sent to the second node 42 and invalidated in the first node 42, and/or the state of that memory region may be changed in the first node 42 to a shared state. Also in that example, when the first node 42 receives the memory request from the second node 42 for at least one cache line from a memory region for which the first node 42 includes presence data, the first node 42 may modify the presence data for that memory region based on that memory request.

Additionally, the core 12 may include a prefetch region buffer 88 and a prefetch data buffer 90. The prefetch region buffer 88 (illustrated as, and hereinafter, "PRB" 88) may be an array for storing presence data about memory regions that may be candidates for prefetching to the caches 83, 84, presence data about memory regions for which there is at least one prefetched cache line in the prefetch data buffer 90, including presence data for memory regions adjacent to those with at least one cached cache line in the node 42. In some embodiments, the RCA 86 and/or PRB 88 may receive presence data for at least one memory region in response to a first memory request. Additionally, the PRB 88 may receive presence data for at least one memory region adjacent to the memory region associated with the first memory request in response to the first memory request. Presence data in the PRB 88 may remain in the PRB 88 until that memory region or a cache line thereof is fetched to the caches 83, 84, fetched by another node 42, or evicted to make room for additional presence data (e.g., presence data in the PRB 88 is evicted to make room for additional presence data by way of a least-recently-used, least-frequently-used, or other cache algorithm policy as is well known in the art). The prefetch data buffer 90 (illustrated as, and hereinafter, "PDB" 90), however, may hold at least one cache line (e.g., at least one prefetched cache line) until that cache line is moved to the caches 83, 84, fetched by another node 42, or evicted to make room for an additional cache line (e.g., cache lines in the PDB 90 are evicted to make room for additional cache lines also by way of a least-recently-used, least-frequently-used, and/or other cache algorithm policy as is well known in the art).

In some embodiments, the processing element 82 accesses the PDB 90 for a cache line prior to broadcasting a memory request for that cache line to the system 40. When there is an access for the cache line (e.g., there is a "hit" for the cache line) in the PDB 90, the cache line is moved to at least one of the caches 83, 84 and/or the processing element 82. When there is a failed access for the cache line (e.g., there is a "miss" for the cache line) in the PDB 90, the processing element 82 may access the RCA 86 and/or PRB 88 for presence data associated with the memory region of the cache line. When the cache line is moved from the PDB 90 to at least one of the caches 83, 84 and/or the processing element 82, presence data associated with the cache line may also be moved from the PRB 88 to the RCA 86, if necessary. For example, the presence data associated with the moved cache line may already be in the RCA 86, and thus presence data associated with that moved cache line will not be moved from the PRB 88 to the RCA 86.

In some embodiments, and as illustrated in FIG. 3, the processing element 82, L2 cache 84, RCA 86, PRB 88, and PDB 90 are configured to communicate through an inter-node command bus 92. As such, the processing element 82 may communicate with any of the L2 cache 84, RCA 86, PRB 88, and/or PDB 90 to issue commands thereto. The L2 cache 84, RCA 86, PRB 88, and PDB 90 are configured to interface with a network fabric interface 94 which may provide communications between the L2 cache 84, RCA 86, PRB 88, and PDB 90 and a node request/response bus 96, as well as provide communications between the L2 cache 84 and PDB 90 and a data bus 98. In some embodiments, the node request/response bus 96 and data bus 98 are configured to communicate between the nodes 42 of the system 40 such that a memory request from a memory requester in a first node 42 may be broadcast to the other nodes of the system 40, including to a second node 42 of the system 40. In specific embodiments, a memory requester in the circuit arrangement 80 may include the caches 83, 84, RCA 86, PRB 88, PDB 90, and/or the processing element 82 or hardware thread thereof.

In response to a memory request from a memory requester, information associated with the memory request, such as presence data associated with the memory request (e.g., presence data for a memory region associated with the memory request and/or presence data associated with a memory region adjacent to the memory region associated with the memory request) may be sent from the second node 42 to the first node 42 on the node request/response bus 96, while a cache line associated with the memory request may be sent from the second node 42 to the first node 42 on the data bus 98. In specific embodiments, presence data associated with the memory request is stored in the RCA 86 and/or PRB 88 of the first node 42, while a cache line associated with the memory request may be stored in the caches 83, 84 and/or PDB 90 of the first node 42. In the event that the processing element 82 of the first node 42 requests the cache line and hits the cache line in the PDB 90, the cache line may be moved to at least one of the caches 83, 84 and/or the processing element 82 and the presence data for the memory region associated with that cache line may be moved from the PRB 88 to the RCA 86.

In some embodiments, the L2 cache 84, RCA 86, PRB 88, and PDB 90 may not be in direct communication with the node request/response bus 96 and/or data bus 98. In those embodiments, the network fabric interface 94 may include at least one network interface (not shown) for the L2 cache 84, RCA 86, PRB 88, and/or PDB 90, either collectively or individually, to communicate with other nodes 42. Cache lines are transferred from the L2 cache 84 to the processing element 82 and/or L1 cache 83 through a cache data bus 100.

Throughout the embodiments of the circuit arrangement 80, a configurable threshold may be configured such that, when triggered by a threshold request for a cache line from a memory region, the node 42 may prefetch a memory region in its entirety. For example, it may be desirable that an entire memory region is prefetched when a processing element 82 has requested separate cache lines from a memory region at least two times. Thus, when the second memory request for the second cache line is made, the node 42 may attempt to prefetch the memory region in its entirety. As the use of one cache line of a memory region typically indicates that multiple cache lines of the memory region are to be used, bubbles or other long latencies associated with the retrieval of cache lines may be decreased by prefetching the entire memory region once the threshold has been reached. In specific embodiments, the threshold may be a second, third, fourth, fifth, sixth, or "nth" memory request for separate cache lines of a memory region, where n is a whole number.

FIG. 4 is a schematic illustration showing several components of one embodiment of an alternative circuit arrangement 110 of a processing core 12 consistent with alternative embodiments of the invention. Similarly to the circuit arrangement 80 of FIG. 3, the circuit arrangement 110 of FIG. 4 includes a processing element 82 with an L1 cache 83 that is in communication with an L2 cache 84 as well as a PRB 88 through an inter-node command bus 92, and the processing element 82 is further in communication with the L2 cache 84 through the cache data bus 100. However, unlike the circuit arrangement 80 of FIG. 3, the circuit arrangement 110 of FIG. 4 does not include the RCA 86 or PDB 90, and instead includes a cached region buffer 112 (illustrated as, and hereinafter, "CRB" 112). The CRB 112, like the RCA 86 of FIG. 3, may track presence data associated with memory regions of cached cache lines. However, the CRB 112 may not include state bits to indicate the state of memory regions. Moreover, prefetched cache lines may be placed directly in the L2 cache 84, while presence data associated with the prefetched cache lines may be sent directly to the CRB 112. The PRB 88 may be configured to presence data associated with memory regions that do not have cache lines present in the caches 83, 84, but that otherwise include at least one cache line that is a candidate for prefetching. As such, the circuit arrangement 110 of FIG. 4 offers a simpler design than the circuit arrangement 80 of FIG. 3. In specific embodiments, a memory requester in the circuit arrangement 110 may include the caches 83, 84, PDB 90, CRB 112, and/or the processing element 82 or hardware thread thereof. It will be appreciated by one having skill in the art that, in further alternative embodiments, the circuit arrangement 110 of FIG. 4 may not include the PRB 88.

Referring to both FIG. 3 and FIG. 4, the RCA 86 and CRB 112 may be configured to determine the state of the memory regions of a first node 42 and the shared status of memory regions throughout the system 40. Table 1 is a table illustrating a protocol for states of memory regions as tracked by the RCA 86 and CRB 112 and consistent with embodiments of the invention. In some embodiments, the RCA 86 and CRB 112 are responsive to memory requests from a first node 42 of the system 40 as well as other nodes 42 of the system 40 (including a second node 42 of the system 40) to change a state of a memory region. These states may be checked by the processing element 82 of the first node 42 before broadcasting a memory request to the system 40 such that the first node 42 may make a memory request directly to memory if the memory region state indicates that a broadcast of the memory request to other nodes 42 is unnecessary.

TABLE 1

Region Protocol States

| State | State of Cache Lines in First Node | State of Cache Lines in Other Nodes (Including Second Node) |
|---|---|---|
| Invalid (I) | No cache lines. | Unknown. |
| Clean-Invalid (CI) | Unmodified cache lines only. | No cached cache lines. |
| Clean-Clean (CC) | Unmodified cache lines only. | Unmodified cache lines only. |
| Clean-Dirty (CD) | Unmodified cache lines only. | May have modified cache lines. |
| Dirty-Invalid (DI) | May have modified cache lines. | No cached cache lines |
| Dirty-Clean (DC) | May have modified cache lines. | Unmodified cache lines only. |
| Dirty-Dirty (DD) | May have modified cache lines. | May have modified cache lines. |

As shown in Table 1, an Invalid (I) state indicates that no cache lines associated with a memory region are cached in the node 42 and that the state of cache lines associated with the memory region in other nodes 42 of the system 40 is unknown. As for the remainder of the states, the first part of the states indicates whether there are clean ("C") or modified ("dirty," or "D") copies of cache lines associated with the memory region cached in the node 42. The second letter indicates whether other nodes 42 of the system 40 have shared cache lines associated with the memory region ("invalid, or "I," if the memory region is not shared, or "clean" if there are unmodified copies of caches lines associated with the memory region) or modified ("dirty," or "D") copies of the cache lines associated with the memory region.

In general, the CI and DI states are exclusive states, as the first node 42 is the only node 42 of the system 40 that includes the cached cache lines associated with the memory region. As such, requests by the first node 42 for additional cache lines associated with the memory region are not required to be broadcast to the other nodes 42, and the first node 42 may make a memory request directly to the memory region for additional cache lines associated with the memory region. The CC and DC states, however, are externally clean states, in that memory requests to read the shared cache lines associated with the memory region can be performed without a broadcast, but memory requests to modify the copies of the shared cache lines should be preceded by a memory request to the other nodes 42 to obtain a modifiable copy. Finally, the CD and DD states are externally dirty states, and memory requests associated with cache lines should be broadcast to the other nodes 42 to ensure that the most recent copies of cache lines are obtained prior to modifying those cache lines.

Figure 5:
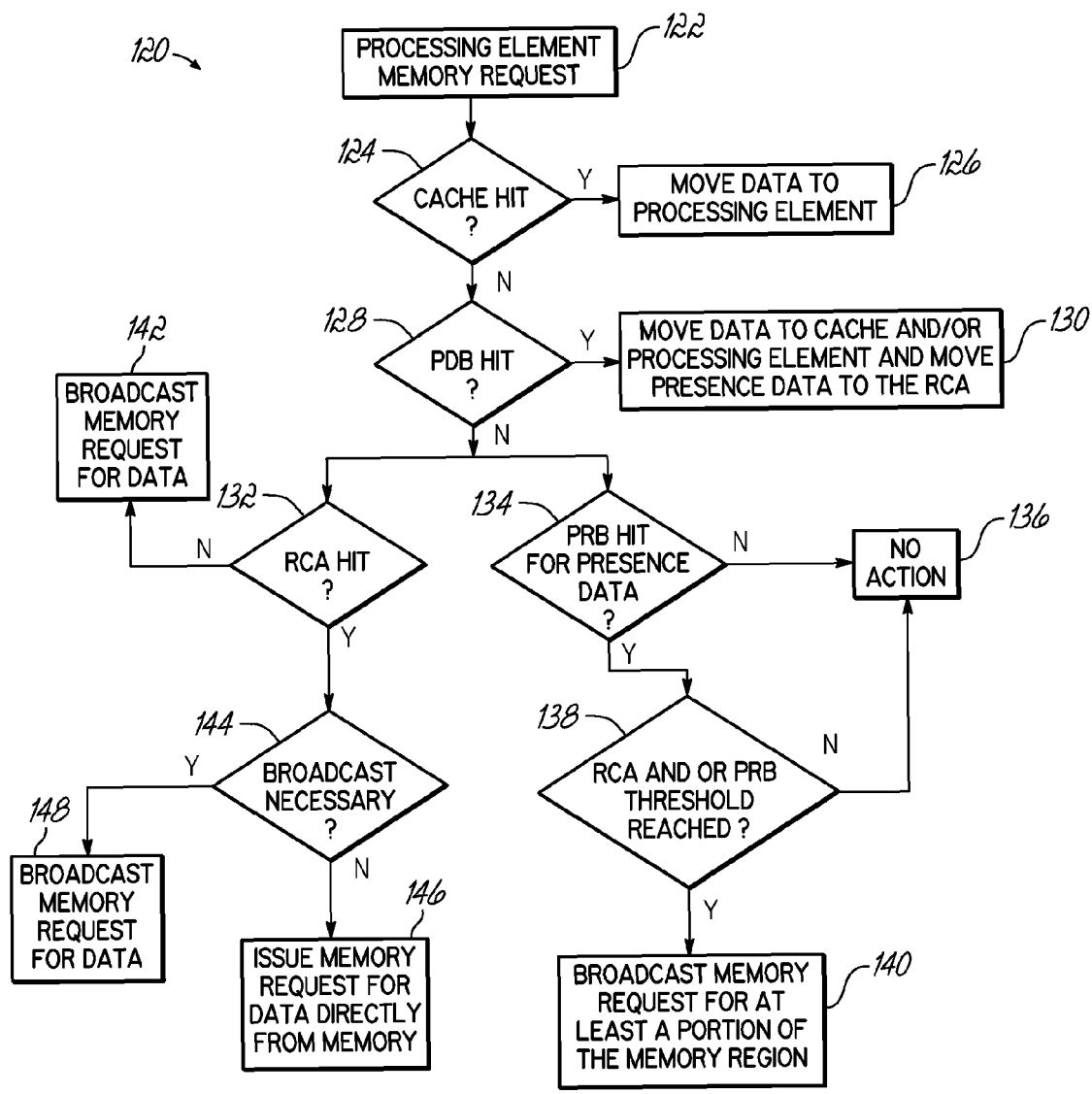
FIG. 5 is a flowchart illustrating one embodiment of a logic flow to generate a memory request in the node of FIG. 3.

FIG. 5 is a flowchart 120 illustrating one embodiment of a logic flow that occurs in a node of a shared memory computing system, the node including at least a region coherence array, a prefetch region buffer, and a prefetch data buffer consistent with embodiments of the invention. In some embodiments, the processing element of the node makes a memory request for data (block 122), which may be for a cache line from a memory region, and in particular for a data cache line and/or an instruction cache line as is well known in the art. A cache of the node is accessed for the data (block 124), and in the event of a hit for the data in the cache ("Yes" branch of decision block 124) the data may be moved to the processing element (block 126). When there is not a hit for the data in the cache ("No" branch of decision block 124), a prefetch data buffer may be accessed for the data (block 128). In the event of a hit for the data in the prefetch data buffer ("Yes" branch of decision block 124), the data may be moved to the cache and/or the processing element and presence data associated with that data may be moved to a region coherence array of the node (block 130). When there is not a hit for the data in the prefetch data buffer ("No" branch of decision block 128), the region coherence array and/or a prefetch region buffer may be accessed for presence data associated with the memory region of the data (blocks 132 and 134, respectively).

In some embodiments consistent with the invention, the prefetch region buffer stores presence data for memory regions that are candidates for prefetching. When a memory region or cache line thereof is fetched (e.g., from a second node of the shared memory computing system to the cache, or from the prefetch data buffer to the cache), the presence data for that memory region may be moved to the region coherence array. Thus, presence data associated with a cache line may be configured in the region coherence array, the prefetch region buffer, or neither, but never both. In some embodiments, this provides a simple coherency to know exactly where data is in the node, or if it is not present in the node. As such, the prefetch region buffer and region coherence array may be accessed for presence data associated with the memory region of the data. When there is not a hit for the presence data associated with the data in the prefetch region buffer ("No" branch of decision block 134), no action may be taken (block 136), as there may be presence data for that memory region in the region coherence array. When there is a hit for the presence data associated with the data in the prefetch region buffer ("Yes" branch of decision block 134), the presence data for that memory region may be accessed in the region coherence array and/or prefetch region buffer to determine if a threshold number of requests for separate cache lines of that memory region have been reached (block 138). In some embodiments, presence data for each memory region includes an indication of the number of times separate cache lines from that memory region have been requested. In the event that the threshold number of separate cache lines from a memory region have not been requested, the threshold number of memory requests has not been reached ("No" branch of decision block 138), and no further action may be taken (block 136). In the event that the threshold number of separate cache lines from a memory region have been requested (e.g., for example, the threshold may be two separate lines and the processing element requests a first cache line associated with a first memory region and then requests a second cache line associated with the first memory region but before requesting the first cache line again and thus sourcing the presence data from the prefetch region buffer to the region coherence array), the region coherence array and/or prefetch data buffer determines that a threshold number of memory requests have been reached ("Yes" branch of decision block 138), and a memory request for at least a portion of the memory region, in some embodiments including the data (e.g., the cache line) associated with the processing element memory request, may be broadcast to the nodes of the shared memory computing system (block 140). In some embodiments, the broadcast memory request (block 140) may request only that data which has not already been broadcast based on the presence data. For example, when the presence data include memory bit-masks of memory regions, those cache lines that have not been requested may be requested in the broadcast memory request (block 140).

Returning to block 132, the region coherence array may be separately checked for whether a memory request should be separately broadcast or may be issued directly to memory for the data. When there is not a hit in the region coherence array for the presence data associated with the data ("No" branch of decision block 132), a memory request for the data associated with the processing element memory request may be broadcast to the nodes of the shared memory computing system (block 142). It will be appreciated that this broadcast in block 142 may be combined with the broadcast in block 140. When there is a hit in the region coherence array for the presence data associated with the data ("Yes" branch of decision block 132), it is determined if broadcasting a memory request to the other nodes of the shared memory computing system for the data is required based on the presence data (block 144).

In some embodiments, the presence data for a memory region indicates the state of that memory region and/or the presence data for a memory region indicates the state of each cache line in that memory region. These states may be updated in response to receiving memory requests for the cache lines from other nodes of the shared computing system, or in response to presence data and/or data received from memory requests. For example, a broadcast may be required if a memory region and/or cache line is in an invalid, clean-dirty, or dirty-dirty state as detailed above and as is well known in the art. Additionally, a broadcast may be required if a memory region and/or cache line is in the clean-clean or dirty-clean state and a modifiable copy of that memory region and/or cache line is required. However, a broadcast may not be required if a memory region and/or cache line is in a clean-invalid or dirty-invalid state as detailed above and as is well known in the art. Thus, it is determined if broadcasting a memory request to the other nodes of the shared memory computing system for the data is required based on the presence data (block 144). When a broadcast of the memory request is not required ("No" branch of decision block 144), a memory request for the data may be issued directly to the memory of the shared memory computing system (block 146). When a broadcast of the memory request is required ("Yes" branch of decision block 144), a memory request for the data may be broadcast to the nodes of the shared memory computing system (block 148). It will be appreciated that this broadcast in block 148 may be combined with the broadcast of block 140. In some embodiments, issuing the memory request directly to the memory of the shared memory computing system bypasses the nodes of the shared memory computing system, which, based on the presence data for the memory region, are known to not include requested cache lines of the memory region, or, in the alternative, other cache lines of the memory region of the requested cache lines. Thus, the other nodes of the shared memory computing system may not receive an unnecessary request for the data and processing time may not be expended on unnecessary requests. In some embodiments, the issuance of the memory request (block 146) requests only that data which has not already been cached based on the presence data. For example, when the presence data includes memory bit-masks of memory regions, those cache lines that have not been cached may be requested in the broadcast memory issuance (block 146).

Figure 6:
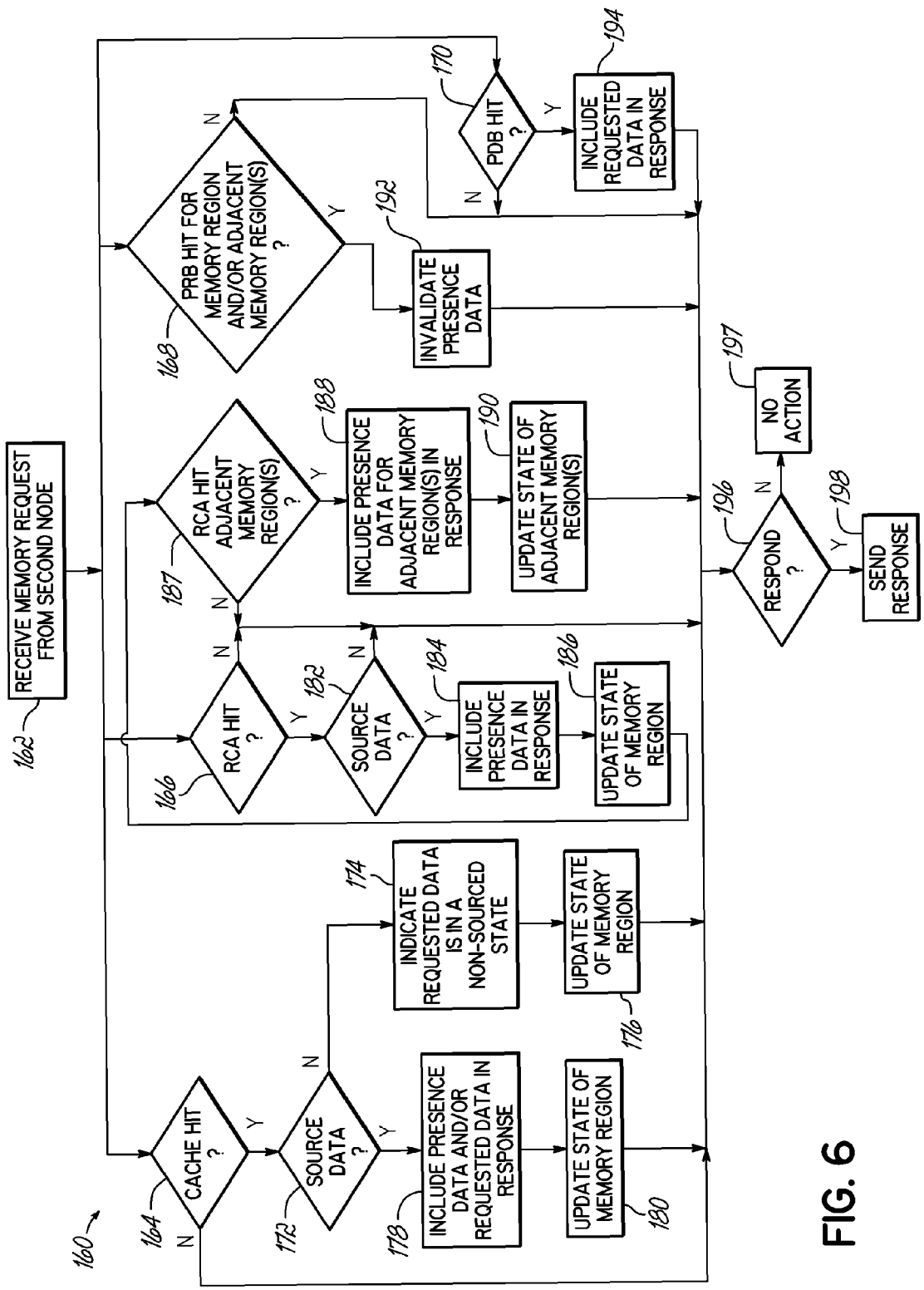
FIG. 6 is a flowchart illustrating one embodiment of a logic flow to check for data and presence data associated with a memory request, as well as presence data for a memory region adjacent that associated with the memory request, in the node of FIG. 3.

FIG. 6 is a flowchart 160 illustrating one embodiment of a logic flow that occurs in a first node of a shared memory computing system consistent with embodiments of the invention when that first node receives a memory request from a memory requester of a second node of the shared memory computing system (block 162). In response to receiving the memory request, the cache of the first node may be accessed to determine if there is a hit for the data associated with the memory request (block 164), the region coherence array of the first node may be accessed to determine if there is a hit for presence data associated with the memory request (block 166), the prefetch region buffer may be accessed to determine if there is a hit for presence data associated with the memory request (block 168), the prefetch region buffer may be accessed to determine if there is a hit for presence data associated with a memory region adjacent to the memory region associated with the memory request (also illustrated in block 168), and/or the prefetch data buffer may be accessed to determine if there is a hit for the data associated with the memory request (block 170).

When there is a hit for the data associated with the memory request in the cache ("Yes" branch of decision block 164), it may be determined whether the data will be sourced (block 172). In some embodiments, the first node may not source data in a locked, modified, or otherwise protected state. For example, when the data associated with the memory request is in the cache and exclusively used (e.g., the data is "locked"), when the data associated with the memory request is being modified, when the data associated with the memory request is modified and the memory is not yet updated, and/or for another reason well known in the art, the first node may not source the data. In those embodiments, the first node may determine that it will not source the data ("No" branch of decision block 172) and an indication that the requested data is cached and in a non-shared state may be included in the response (block 174). Moreover, the state of the memory region associated with the presence data may be updated and/or the presence data indicating the state of the memory region may be updated to indicate that the requested data is in a non-shared state (block 176). Conversely, and returning to block 172, when the first node will source the data ("Yes" branch of decision block 172), the requested data and/or presence data associated therewith is included in the response (block 178). Moreover, in an optional step and in response to including the requested data in the response (block 178), the state of the memory region associated with the requested data may be updated to indicate the sharing of the requested data (block 180). In specific embodiments, the state of the presence data associated with the requested data may be updated to indicate that the memory region is shared (block 180).

When there is a hit for presence data associated with a memory region associated with the memory request in the region coherence array ("Yes" branch of decision block 166), it may be determined whether the data will be sourced (block 182) in a similar manner to block 172. When the data will be sourced ("Yes" branch of decision block 182), presence data associated with the requested data may be included in the response (block 184). Moreover, in an optional step, the state of the memory region associated with the presence data may be updated and/or the presence data indicating the state of the memory region may be updated to indicate the sharing of the requested data (block 186).

After determining to source the data ("Yes" branch of decision block 182) the region coherence array may be accessed to determine if there is a hit for presence data associated with a memory region adjacent to the memory region associated with the memory request (block 187). When there is a hit for presence data associated with a memory region adjacent to the memory region associated with the memory request in the region coherence array ("Yes" branch of decision block 187), presence data associated with the adjacent memory region(s) from the region coherence array may be included in the response (block 188). Moreover, in an optional step and in response to including the presence data associated with the adjacent memory region(s) from the region coherence array in the response, the state of the adjacent memory region(s) may be updated to indicate the sharing of the requested data (block 190).

When there is a hit for presence data associated with the memory request in the prefetch region buffer and/or when there is a hit for presence data associated with a memory region(s) adjacent to the memory region associated with the memory request in the prefetch region buffer ("Yes" branch of decision block 168), presence data associated with the memory request from the prefetch region buffer and/or presence data associated with the memory region(s) adjacent to the memory region associated with the memory request may be invalidated from the prefetch region buffer (block 192). Finally, when there is a hit for the data associated with the memory request in the prefetch data buffer ("Yes" branch of decision block 170), the requested data from the prefetch data buffer may be included in the response (block 194). In some embodiments, when the requested data from the prefetch data buffer is included in the response, the requested data is invalidated from the prefetch data buffer.

After determining whether there is a hit for the requested data in the cache (block 164), after determining whether there is a hit for presence data associated with the memory request in the region coherence array and/or prefetch region buffer (blocks 166 and 168, respectively), after determining whether there is a hit for presence data associated with a memory region adjacent to the memory region associated with the memory request in the region coherence array and/or prefetch region buffer (blocks 187 and 168, respectively), and/or after determining whether there is a hit for the requested data in the prefetch data buffer (block 170), the first node may determine whether to respond to the memory request from the second node (block 196). When the first node determines that no response is necessary (e.g., the process proceeds through the "No" branches of block 164, block 166, block 168, block 170, and/or block 182) ("No" branch of block 196), no action may be taken by the first node to respond to the memory request from the second node (block 197). However, when requested data and/or presence data is included in the response (e.g., from blocks 174, 178, 184, 188, and/or 194), the first node determines that a response is required ("Yes" branch of block 196) and may send a response that includes that requested data and/or presence data to the second node (block 198). In specific embodiments, when the first node sends the response (block 198), at least one requested cache line may be sent from the first node to the second node on a node data bus, and the presence data may be sent from the first node to the second node on a node request/response bus.

Figure 7:
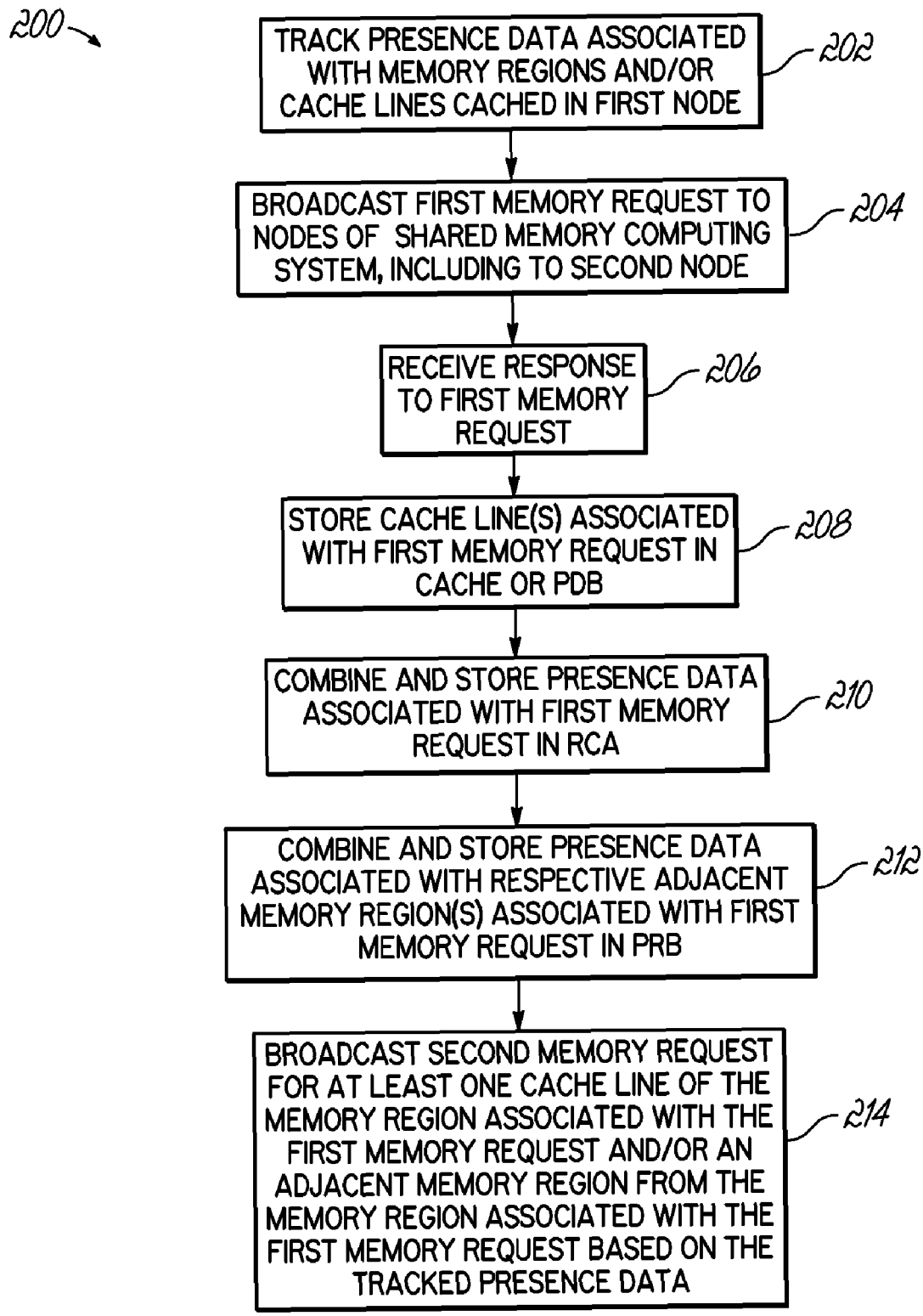
FIG. 7 is a flowchart illustrating one embodiment of a logic flow to track presence data received in response to memory requests, as well as broadcast memory requests based on presence data, in the node of FIG. 3.

FIG. 7 is a flowchart 200 illustrating one embodiment of a logic flow that occurs in a first node of a shared memory computing system to track presence data associated with cache lines in memory regions cached in the first node consistent with embodiments of the invention (block 202). For example, a memory requester of a first node may broadcast a first memory request to the other nodes of the shared memory computing system, including at least a second node of the shared memory computing system (block 204), and, in response to the first memory request, the first node may receive at least one response to the first memory request (block 206). The first node may receive a response to the first memory request from at least one other node of the shared computing system, including at least the second node, that includes presence data for a memory region associated with the first memory request and/or the data (e.g., at least one cache line) associated with the first memory request (block 206).

In response to receiving the response to the first memory request, the first node may store cache lines received in the response in a cache and/or a prefetch data buffer of the first node (block 208). In some embodiments, the first node may store the cache lines received in the response in the cache, thus having those cache lines immediately available for processing. In alternative embodiments, the first node may store the cache lines received in the response in the prefetch data buffer and move those cache lines from the prefetch data buffer to the cache and/or processing element of the first node in response to a second memory request for the prefetched cache line from the processing element. Presence data associated with the first memory request (e.g., for example, presence data associated with the first memory request may include presence data associated with the data associated with the first memory request) received in the response to the first memory request may, in turn, be combined respective to the memory regions thereof (e.g., the presence data for each respective memory region may be logically OR'd to combine the respective presence data for each memory region) and that combined presence data associated with the requested data may be stored in a region coherence array of the first node (block 210). Presence data associated with memory regions adjacent to the memory region associated with the first memory request received in response to the first memory request may be combined (e.g., the presence data for each respective adjacent memory region may be logically OR'd to combine the respective presence data for each memory region) and stored in the prefetch region buffer of the first node (block 212). In the event that a prefetched cache line stored in the prefetch data buffer is moved from the prefetch data buffer to the cache and/or processing element of the first node, the presence data associated with that prefetched cache line may be moved to the region coherence array. On the other hand, in the event that a prefetched cache line stored in the prefetch data buffer is invalidated from the prefetch data buffer, then presence data associated with that prefetched cache line may be invalidated from the prefetch region buffer. Thus, the first node may not only receive presence data for the memory region associated with the first memory request, but also presence data for memory regions adjacent to the memory request associated with the first memory request.

In some embodiments, a second memory request may be broadcast by a memory requester of the first node to the other nodes of the shared computing system, including the second node, for at least one cache line of the same memory region associated with the first memory request and/or an adjacent memory region to that memory region based on the tracked presence data (block 214). In some embodiments, the second memory request may request at least one cache line based on the presence data for a memory region such that the first node attempts to prefetch that memory region in its entirety. In alternative embodiments, the second memory request may request at least one cache line based on the presence data for a memory region such that the first node attempts to prefetch at least a portion of that memory region.

Figure 8:
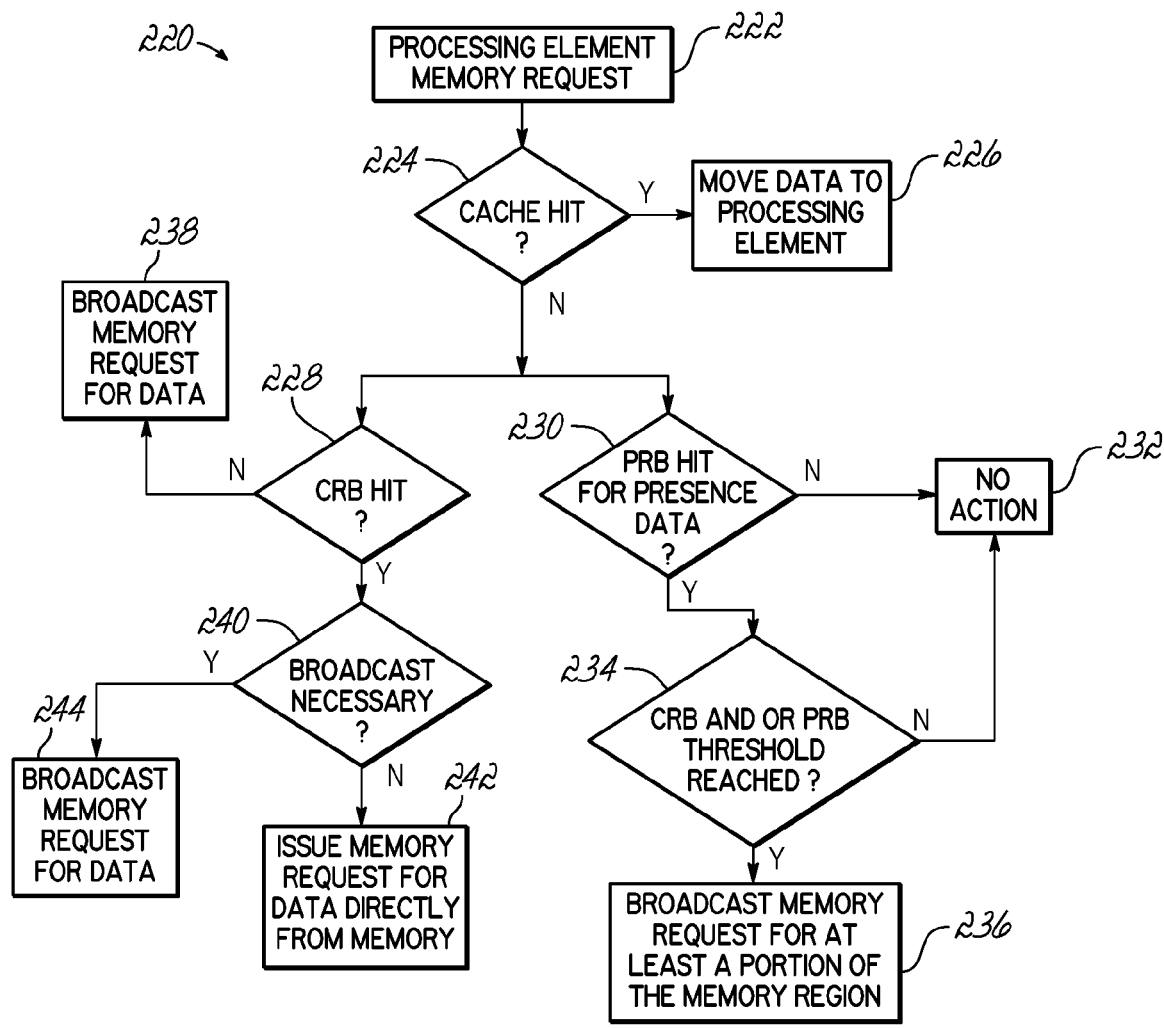
FIG. 8 is a flowchart illustrating one embodiment of a logic flow to generate a memory request in the node of FIG. 4.

FIG. 8 is a flowchart 220 illustrating one embodiment of a logic flow that occurs in a node of a shared memory computing system, the node including at least a cached region buffer and a prefetch region buffer consistent with alternative embodiments of the invention. In some embodiments, the processing element of the node makes a memory request for data (block 222), which may be for a cache line from a memory region, and in particular for a data cache line and/or an instruction cache line as is well known in the art. A cache of the node is accessed for the data (block 224), and in the event of a hit for the data in the cache ("Yes" branch of decision block 224) the data may be moved to the processing element (block 226). When there is not a hit for the data in the cache ("No" branch of decision block 224), the cached region buffer and/or a prefetch region buffer may be accessed for presence data associated with the memory region of the data (blocks 228 and 230, respectively).

In some embodiments consistent with the invention, the prefetch region buffer stores presence data for memory regions that are candidates for prefetching. When a memory region, or a cache line thereof is fetched (e.g., from a second node of the shared memory computing system to the cache), the presence data for that memory region may be moved to the cached region buffer. Thus, presence data associated with a cache line may be configured in the cached region buffer, the prefetch region buffer, or neither, but never both. In some embodiments, this provides a simple coherency to know exactly where data is in the node, or if it is not present in the node. As such, the prefetch region buffer and cached region buffer may be accessed for presence data associated with the memory region of the data. When there is not a hit for the presence data associated with the data in the prefetch region buffer ("No" branch of decision block 230), no action may be taken (block 232), as there may be presence data for that memory region in the cached region buffer. When there is a hit for the presence data associated with the data in the prefetch region buffer ("Yes" branch of decision block 232), the presence data for that memory region may be accessed in the cached region buffer and/or prefetch region buffer to determine if a threshold number of requests for separate cache lines of that memory region have been reached (block 234). In some embodiments, presence data for each memory region includes an indication of the number of times separate cache lines from that memory region have been requested. In the event that the threshold number of separate cache lines from a memory region have not been requested, the threshold number of memory requests has not been reached ("No" branch of decision block 234), no further action may be taken (block 232). In the event that the threshold of separate cache lines from a memory region have been requested (e.g., for example, the threshold may be two separate lines and the processing element requests a first cache line associated with a first memory region and then requests a second cache line associated with the first memory region but before requesting the first cache line again and thus sourcing the presence data from the prefetch region buffer to the cached region buffer), the cached region buffer and/or prefetch data buffer determines that a threshold number of memory requests have been reached ("Yes" branch of decision block 234), and a memory request for at least a portion of the memory region, including in some embodiments the data (e.g., the cache line) associated with the processing element memory request, may be broadcast to the nodes of the shared memory computing system (block 236). In some embodiments, the broadcast for the memory request (block 236) may request only that data which has not already been broadcast based on the presence data. For example, when the presence data include memory bit-masks of memory regions, those cache lines that have not been requested may be requested in the broadcast memory request (block 236).

Returning to block 228, the cached region buffer may be separately checked for whether a memory request should be separately broadcast or may be issued directly to memory for the data. When there is not a hit in the cached region buffer for presence data associated with the memory region of the data ("No" branch of decision block 228) a memory request for the data associated with the processing element memory request is broadcast to the nodes of the shared memory computing system (block 238). It will be appreciated that this broadcast in block 238 may be combined with the broadcast in block 236. When there is a hit in the cached region buffer for the presence data associated with the data ("Yes" branch of decision block 228), it is determined if broadcasting a memory request to the other nodes of the shared memory computing system for the data is required based on the presence data (block 240).

In some embodiments, the presence data for a memory region indicates the state of the memory region and/or the presence data for a memory region indicates the state of each cache line in the memory region. These states may be updated in response to receiving memory requests for the cache lines from other nodes of the shared computing system, or in response to presence data and/or data received from memory requests. When a broadcast of the memory request is not requires ("No" branch of decision block 240), a memory request for the data may be issued directly to the memory of the shared memory computing system (block 242). When a broadcast of the memory request is required ("Yes" branch of decision block 240), a memory request for the data may be broadcast to the nodes of the shared memory computing system (block 244). It will be appreciated that this broadcast in block 244 may be combined with the broadcast of block 236. In some embodiments, issuing the memory request directly to the memory of the shared memory computing system bypasses the nodes of the shared memory computing system, which, based on the presence data for the memory region, are known to not include requested cache lines of the memory region, or, in the alternative, other cache lines of the memory region of the requested cache lines. Thus, the other nodes of the shared memory computing system may not receive an unnecessary request for the data and processing time may not be expended on unnecessary requests. In some embodiments, the broadcast for the memory request (block 244) requests only that data which has not already been cached based on the presence data. For example, when the presence data include memory bit-masks of memory regions, those cache lines that have not been cached may be requested in the broadcast memory request (block 244).

Figure 9:
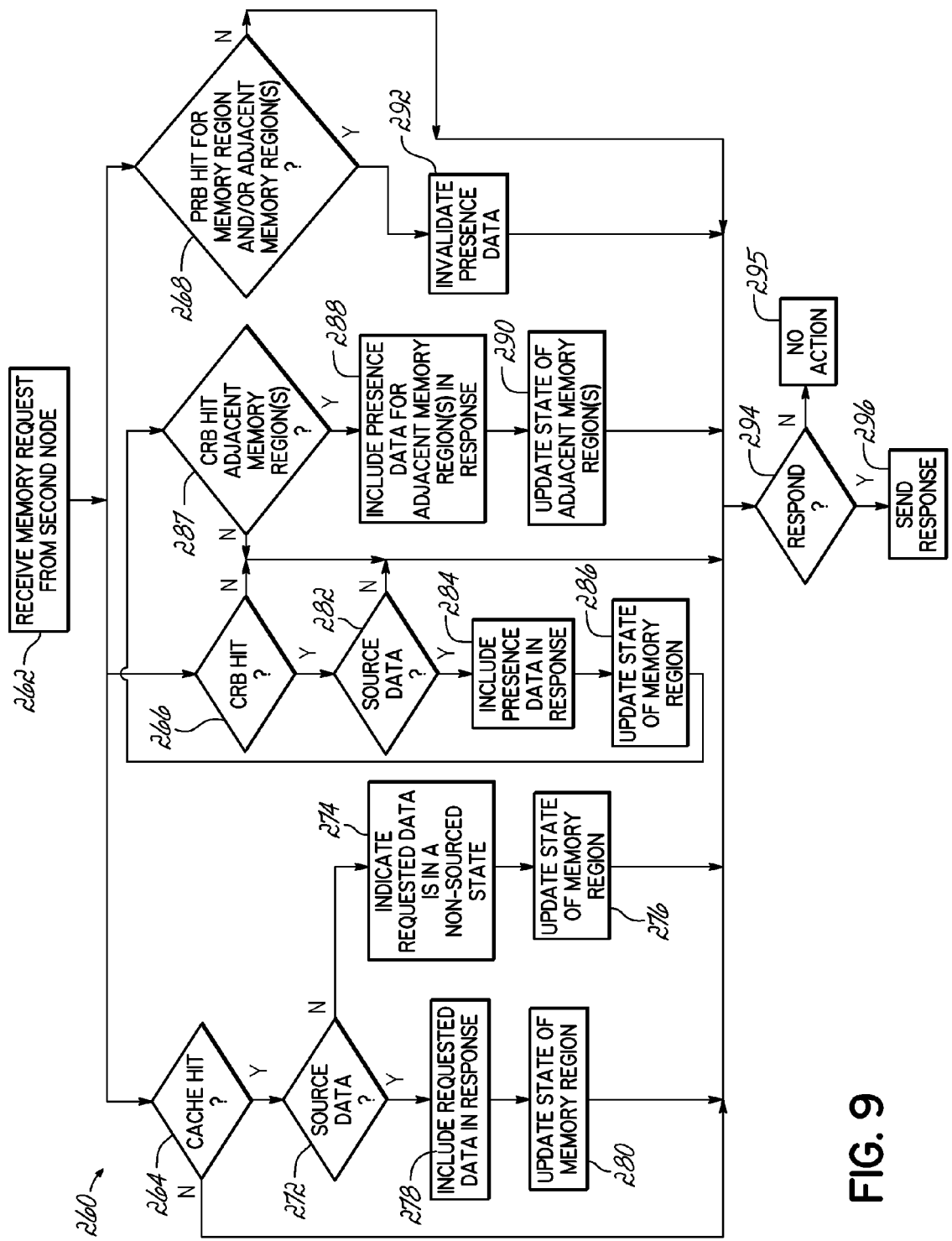
FIG. 9 is a flowchart illustrating one embodiment of a logic flow to check for data and presence data associated with a memory request, as well as presence data for a memory region adjacent that associated with the memory request, in the node of FIG. 4.

FIG. 9 is a flowchart 260 illustrating one embodiment of a logic flow that occurs in a first node of a shared memory computing system consistent with embodiments of the invention when that first node receives a memory request from a memory requester of a second node of the shared memory computing system (block 262). In response to receiving the memory request, the cache of the first node may be accessed to determine if there is a hit for the data associated with the memory request (block 264), the cached region buffer of the first node may be accessed to determine if there is a hit for presence data associated with the memory request (block 266), the prefetch region buffer may be accessed to determine if there is a hit for presence data associated with the memory request (block 268), and/or the prefetch region buffer may be accessed to determine if there is a hit for presence data associated with a memory region adjacent to the memory region associated with the memory request (also illustrated in block 268).

When there is a hit for the data associated with the memory request (block 262) in the cache ("Yes" branch of decision block 264), it may be determined whether the data will be sourced (block 272). In some embodiments, the first node may not source data in a locked, modified, or otherwise protected state. For example, when the data associated with the memory request is in the cache and exclusively used (e.g., the data is "locked"), when the data associated with the memory request is being modified, when the data associated with the memory request is modified and the memory is not yet updated, and/or for another reason well known in the art, the first node may not source the data. In those embodiments, the first node may determine that it will not source the data ("No" branch of decision block 272) and the presence data associated with the requested data that indicates the requested data is cached and in a non-shared state may be included in the response (block 274). Moreover, the state of the memory region associated with the presence data may be updated and/or the presence data indicating the state of the memory region may be updated to indicate that the requested data is in a non-shared state (block 276). Conversely, and returning to block 272, when the first node will source the data ("Yes" branch of decision block 272), at least the requested data is included in the response (block 278), and in some embodiments presence data associated with the requested data is also included in the response. Moreover, in an optional step and in response to including the requested data in the response (block 278), the state of the memory region associated with the requested data may be updated to indicate the sharing of the requested data (block 280). In specific embodiments, the state of the presence data associated with the requested data may be updated to indicate that the memory region is shared (block 280).

When there is a hit for presence data associated with a memory region associated with the memory request in the cached region buffer ("Yes" branch of decision block 266), it may be determined whether the data will be sourced (block 282) in a similar manner to block 272. When the data will be sourced ("Yes" branch of decision block 282), presence data associated with the requested data may be included in the response (block 284). Moreover, in an optional step, the state of the memory region associated with the presence data may be updated and/or the presence data indicating the state of the memory region may be updated to indicate the sharing of the requested data (block 286).

After updating the state of the memory region in block 286, the cached region buffer may be accessed to determine if there is a hit for presence data associated with a memory region adjacent to the memory region associated with the memory request (block 287). When there is a hit for presence data associated with a memory region adjacent to the memory region associated with the memory request in the cached region buffer ("Yes" branch of decision block 287), presence data associated with the adjacent memory region(s) from the cached region buffer may be included in the response (block 288). Moreover, in an optional step and in response to including the presence data associated with the adjacent memory region(s) from the region coherence array in the response, the state of the adjacent memory region(s) may be updated to indicate the sharing of the requested data (block 290).

When there is a hit for presence data associated with the memory request in the prefetch region buffer and/or when there is a hit for presence data associated with a memory region(s) adjacent to the memory region associated with the memory request in the prefetch region buffer ("Yes" branch of decision block 268), presence data associated with the memory region and/or presence data associated with the memory region(s) adjacent to the memory region associated with the memory request may be invalidated from the prefetch region buffer (block 292).

After determining whether there is a hit for the requested data in the cache (block 264), after determining whether there is a hit for presence data associated with the memory request in the cached region buffer and/or prefetch region buffer (blocks 266 and 268, respectively), and/or after determining whether there are hits for presence data associated with a memory region adjacent to the memory region associated with the memory request in the cached region buffer and/or prefetch region buffer (blocks 287 and 268, respectively), the first node may determine whether to respond to the memory request from the second node (block 294). When the first node determines that no response is necessary (e.g., the process proceeds through the "No" branches of block 264, block 266, block 268, and/or block 282) ("No" branch of block 294), no action may be taken by the first node to respond to the memory request from the second node (block 295). However, when requested data and/or presence data is included in the response (e.g., from blocks 278, 284, and/or 288), the first node determines that a response is required ("Yes" branch of block 294) and may send a response that includes that requested data and/or presence data to the second node (block 296). In specific embodiments, when the first node sends the response (block 296), at least one requested cache line may be sent from the first node to the second node on a node data bus, and the presence data may be sent from the first node to the second node on a node request/response bus.

Figure 10:
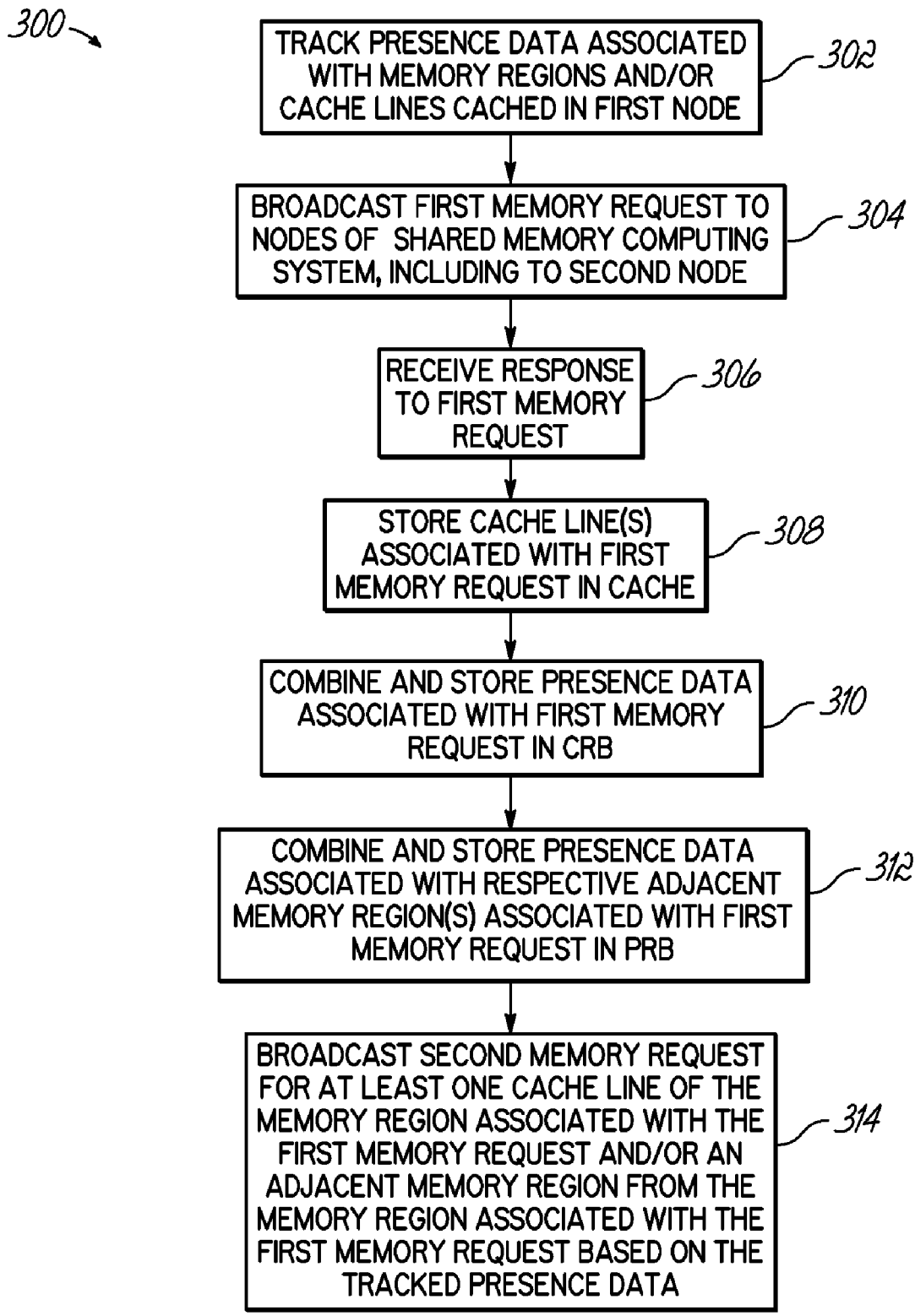
FIG. 10 is a flowchart illustrating one embodiment of a logic flow to track presence data received in response to memory requests, as well as broadcast memory requests based on presence data, in the node of FIG. 4.

FIG. 10 is a flowchart 300 illustrating one embodiment of a logic flow that occurs in a first node of a shared memory computing system to track presence data associated with cache lines in memory regions cached in the first node consistent with embodiments of the invention (block 302). For example, a memory requester of a first node may broadcast a first memory request to the other nodes of the shared memory computing system, including at least a second node of the shared memory computing system (block 304), and, in response to the first memory request, the first node may receive at least one response to the first memory request (block 306). The first node may receive a response to the first memory request from at least one other node of the shared computing system, including at least the second node, that includes presence data for a memory region associated with the first memory request and/or the data (e.g., at least one cache line) associated with the first memory request (block 306).

In response to receiving the response to the first memory request, the first node may store cache lines received in the response in the cache of the first node (block 308). Presence data associated with the first memory request (e.g., for example, presence data associated with the first memory request may include presence data associated with the data associated with the first memory request) received in the response to the first memory request may, in turn, be combined respective to the memory regions thereof (e.g., the presence data for each respective memory region may be logically OR'd to combine the respective presence data for each memory region) and that combined presence data associated with the requested data may be stored in a cached region buffer (block 310). Presence data associated with memory regions adjacent to the memory region associated with the first memory request received in response to the first memory request may be combined (e.g., the presence data for each respective adjacent memory region may be logically OR'd to combine the respective presence data for each memory region) and stored in the prefetch region buffer (block 312). Thus, the first node may not only receive presence data for the memory region associated with the first memory request, but also presence data for memory regions adjacent to the memory request associated with the first memory request.

In some embodiments, a second memory request may be broadcast by a memory requester of the first node to the other nodes of the shared computing system, including the second node, for at least one cache line of the same memory region associated with the first memory request and/or an adjacent memory region to that memory region based on the tracked presence data (block 314). In some embodiments, the second memory request may request at least one cache line based on the presence data for a memory region such that the first node attempts to prefetch that memory region in its entirety. In alternative embodiments, the second memory request may request at least one cache line based on the presence data for a memory region such that the first node attempts to prefetch at least a portion of that memory region.

While embodiments of the present invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, the computer of FIG. 1 and the system of FIG. 2 may include additional components, such as displays, I/O devices, routers, and/or other components without departing from the scope of the invention. Moreover, each of the nodes of the system of FIG. 2 may be configured with more than one core as is well known in the art. Additionally, the circuit arrangements of FIG. 3 and FIG. 4 may include memory controllers, additional network interfaces, additional cache levels (e.g., an L3 and/or L4 cache) and/or other components without departing from the scope of the invention.

Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the present invention. For example, although blocks 132 and 134 of FIG. 5 and blocks 228 and 230 of FIG. 8 are illustrated as occurring substantially concurrently and separately, the blocks may be re-ordered and/or combined without departing from the scope of the invention. For example, block 132 and at least a portion of blocks 142-148 may be executed after block 134. Similarly, block 134 and at least a portion of blocks 136-140 may be executed after block 132. Also for example, block 228 and at least a portion of blocks 238-244 may be executed after block 230. Similarly, block 230 and at least a portion of blocks 232-236 may be executed after block 228. As another example, although blocks 164-170 of FIG. 6 are illustrated as occurring concurrently, at least a portion of those blocks may be re-ordered and/or combined without departing from the scope of the invention. Similarly, although blocks 180, 186 and 190 are illustrated as occurring separately, at least a portion of those blocks may be re-ordered and/or combined without departing from the scope of the invention. For example, although blocks 264-268 of FIG. 9 are illustrated as occurring concurrently, at least a portion of those blocks may be re-ordered without departing from the scope of the invention such that at least a portion of those blocks 264-268 are executed serially. Similarly, although blocks 280 and 286 are illustrated as occurring separately, at least a portion of those blocks may be re-ordered and/or combined without departing from the scope of the invention. Moreover, and in specific embodiments, some blocks of the respective FIGS. 5-10 may be dependent upon each other. For example, a prefetch region buffer may be checked for presence data associated with an adjacent memory region to the memory region associated with the requested data only if there is a hit for that memory region associated with the requested data in that prefetch region buffer. Accordingly, departures may be made from such details without departing from the scope of applicants' general inventive concept.

Other modifications will be apparent to one of ordinary skill in the art. Therefore, the invention lies in the claims hereinafter appended.

What is claimed is:

1. A method of responding to a memory request in a shared memory computing system of the type that includes a plurality of nodes, the method comprising, in a first node among the plurality of nodes:
   for each of a plurality of multi-cache line memory regions for which data is cached on the first node, tracking presence data associated with cache lines in such memory regions that are cached in the first node; and
   in response to a memory request to the shared memory computing system generated by a second node among the plurality of nodes for which the first node will source data requested by the memory request, forwarding the tracked presence data for a memory region with which the memory request is associated to the second node.

2. The method of claim 1, the method further comprising:
   in response to the memory request to the shared memory computing system generated by the second node, accessing a cache of the first node for the data requested by the memory request to determine whether the first node will source the data requested by the memory request.

3. The method of claim 2, the method further comprising:
   in response to the memory request to the shared memory computing system generated by the second node, forwarding at least one cache line of the memory region with which the memory request is associated to the second node.

4. The method of claim 3, wherein the memory request is for at least one cache line of the memory region, the method further comprising:
   in response to a hit in the cache for the at least one cache line with which the memory request is associated, accessing a region coherence array for the tracked presence data for the memory region with which the memory request is associated, wherein forwarding the tracked presence data for the memory region with which the memory request is associated to the second node is performed in response to a hit for such tracked presence data; and
   forwarding the at least one cache line with which the memory request is associated to the second node.

5. The method of claim 1, the method further comprising:
   in response to the memory request to the shared memory computing system generated by the second node, accessing a region coherence array for the tracked presence data for the memory region with which the memory request is associated to determine whether the first node will source the data requested by the memory request, wherein forwarding the tracked presence data for the memory region with which the memory request is associated to the second node is performed in response to a hit in the region coherence array for such tracked presence data.

6. The method of claim 5, wherein the memory request is for at least one cache line of the memory region, the method further comprising:

in response to the hit in the region coherence array for the tracked presence data for the memory region with which the memory request is associated, accessing a cache for the at least one cache line of the memory region with which the memory request is associated; and in response to a hit in the cache for the at least one cache line with which the memory request is associated, forwarding the at least one cache line with which the memory request is associated.

7. The method of claim 1, wherein the presence data includes a memory region bit-mask indicating each cache line from the memory region cached in the first node.

8. The method of claim 1, wherein the presence data includes a cache line count indicating a number of cache lines from the memory region cached in the first node.

9. The method of claim 1, wherein the memory region is a first memory region, the method further comprising:

in response to the memory request to the shared memory computing system generated by the second node, forwarding tracked presence data for a second memory region adjacent to the first memory region with which the memory request is associated to the second node.

10. The method of claim 1, wherein the data requested by the memory request includes data selected from the group consisting of at least one cache line of the memory region, the tracked presence data for the memory region, and combinations thereof.

11. A method of prefetching data in a shared memory computing system of the type that includes a plurality of nodes, where each node includes at least one memory requester, the method comprising, in a first node among the plurality of nodes:

in response to a first memory request to the shared memory computing system generated by the first node, receiving, from a second node among the plurality of nodes that sources data requested by the first memory request, presence data for a multi-cache line memory region with which the first memory request is associated, wherein the presence data is associated with cache lines in the memory region that are cached in the second node; and selectively prefetching at least one cache line from the memory region based upon the presence data received from the second node.

12. The method of claim 11, wherein the first memory request is for a first cache line of the memory region, the method further comprising:

in response to the first memory request to the shared memory computing system generated by the first node, receiving, from the second node, the at least one first cache line with which the first memory request is associated.

13. The method of claim 11, wherein the at least one cache line is selectively prefetched from the second node.

14. The method of claim 11, wherein the at least one cache line is selectively prefetched from a third node among the plurality of nodes.

15. The method of claim 11, the method further comprising:

in response to a second memory request to the shared memory computing system generated by the first node, receiving, from the second node, remaining cache lines in the memory region that are cached in the second node; and caching the received remaining cache lines.

16. The method of claim 11, wherein selectively prefetching the at least one cache line from the memory region includes selectively prefetching all the cache lines from the memory region.

17. The method of claim 11, wherein the presence data includes a memory region bit-mask indicating each cache line in the memory region that is cached in the second node.

18. The method of claim 11, wherein the presence data includes a cache line count indicating a number of cache lines in the memory region that are cached in the second node.

19. The method of claim 11, the method further comprising:

for each of a plurality of multi-cache line memory regions for which data is cached on the first node, tracking presence data associated with cache lines in such memory regions that are cached in the first node.

20. The method of claim 11, the method further comprising:

accessing a region coherence array in the first node for the presence data associated with cache lines in the memory region; and in response to a miss for such presence data in the region coherence array, generating the first memory request associated with the memory region.

21. The method of claim 11, wherein the memory region is a first memory region and wherein the at least one cache line includes a first cache line, the method further comprising:

in response to the first memory request to the shared memory computing system generated by the first node, receiving presence data for a second memory region adjacent to the first memory region with which the first memory request is associated; and selectively prefetching at least one second cache line from the second memory region based upon the received presence data.

22. The method of claim 11, wherein the at least one cache line includes a second cache line, wherein the wherein the data requested by the first memory request includes data selected from the group consisting of at least one first cache line of the memory region, the presence data for the memory region, and combinations thereof.

23. A circuit arrangement for prefetching data, the circuit arrangement comprising:

a processing element, the processing element configured to generate a memory request associated with a cache line of a memory region;

at least one cache in communication with the processing element and configured to cache data from each of a plurality of multi-cache line memory regions and provide that data to the processing element, the at least one cache configured to receive the cache line associated with the memory request in response to the memory request;

a region coherence array in communication with the processing element and configured to track presence data for each of the plurality of multi-cache line memory regions for which the data is cached, the region coherence array configured to receive presence data associated with the memory region associated with the memory request in response to the memory request;

a prefetch data buffer in communication with the processing element and the cache, the prefetch data buffer configured to receive at least one prefetched cache line; and a prefetch region buffer in communication with the processing element and configured to receive presence data associated with at least one memory region associated with the respective at least one prefetched cache line.

24. A shared memory computing system of the type that includes a plurality of nodes each comprising the circuit arrangement of claim 23.

25. A design structure embodied in a machine readable medium for designing or manufacturing an integrated circuit device, the integrated circuit device comprising:
- a processing element, the processing element configured to generate a memory request associated with a cache line of a multi-cache line memory region;
- at least one cache in communication with the processing element and configured to cache data from at least one of a plurality of multi-cache line memory regions and provide that data to the processing element, the at least one cache configured to receive the cache line associated with the memory request in response to the memory request;
- a region coherence array in communication with the processing element and configured to track presence data for each of the plurality of multi-cache line memory regions for which the data is cached, the region coherence array configured to receive presence data associated with the memory region associated with the memory request in response to the memory request;
- a prefetch data buffer in communication with the processing element and the cache, the prefetch data buffer configured to receive at least one prefetched cache line; and
- a prefetch region buffer in communication with the processing element and configured to receive presence data associated with at least one memory region associated with the respective at least one prefetched cache line.

* * * * *